US012798238B2

(12) United States Patent
Odaka

(10) Patent No.: US 12,798,238 B2
(45) Date of Patent: Nov. 17, 2026

(54) LIQUID DISCHARGE HEAD, LIQUID DISCHARGE UNIT, AND LIQUID DISCHARGE APPARATUS

(71) Applicant: Toshimichi Odaka, Kanagawa (JP)

(72) Inventor: Toshimichi Odaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 98 days.

(21) Appl. No.: 18/660,280

(22) Filed: May 10, 2024

(65) Prior Publication Data

US 2024/0391236 A1 Nov. 28, 2024

(30) Foreign Application Priority Data

May 23, 2023 (JP) ................................ 2023-084945

(51) Int. Cl.
*B41J 2/14* (2006.01)

(52) U.S. Cl.
CPC ....... *B41J 2/14274* (2013.01); *B41J 2/14201* (2013.01); *B41J 2002/14306* (2013.01); *B41J 2002/14419* (2013.01); *B41J 2202/12* (2013.01)

(58) Field of Classification Search
CPC ................ B41J 2/14274; B41J 2/14201; B41J 2002/14306; B41J 2002/14419; B41J 2202/12
See application file for complete search history.

(56) References Cited

U.S. PATENT DOCUMENTS 11,034,149 B2 * 6/2021 Nishimura ........... B41J 2/14201
2017/0096015 A1 4/2017 Odaka et al.
2017/0120602 A1 5/2017 Nakai et al.
(Continued)

FOREIGN PATENT DOCUMENTS

CN 103158358 A 6/2013
CN 107303754 A 10/2017
(Continued)

OTHER PUBLICATIONS

Office Action issued Sep. 9, 2026 in related Chinese Patent Application No. 202410567457.4.
(Continued)

*Primary Examiner* — Geoffrey S Mruk
(74) *Attorney, Agent, or Firm* — XSENSUS LLP

(57) ABSTRACT

A liquid discharge head includes a nozzle plate, a channel plate, and a common channel substrate. The nozzle plate has multiple nozzles from each of which a liquid is dischargeable. The multiple nozzles are arrayed in a nozzle array direction. The channel plate has multiple pressure chambers arrayed in the nozzle array direction in a pressure chamber area. The multiple pressure chambers respectively communicate with the multiple nozzles. The common channel substrate has a common supply channel communicating with each of the multiple pressure chambers, a common collection channel communicating with each of the multiple pressure chambers, and a communication channel disposed outside the pressure chamber area in the nozzle array direction. The communication channel connects the common supply channel and the common collection channel outside the pressure chamber area and bypass the multiple pressure chambers.

20 Claims, 12 Drawing Sheets

(56) References Cited

U.S. PATENT DOCUMENTS

| | | | |
|---|---|---|---|
| 2017/0157924 A1 | 6/2017 | Otome et al. | |
| 2018/0194135 A1 | 7/2018 | Iwama et al. | |
| 2018/0272730 A1 | 9/2018 | Odaka et al. | |
| 2018/0272743 A1 | 9/2018 | Nakai et al. | |
| 2019/0263119 A1 | 8/2019 | Odaka et al. | |
| 2020/0276818 A1 | 9/2020 | Odaka et al. | |
| 2020/0290349 A1 | 9/2020 | Nishimura | |
| 2022/0032640 A1 | 2/2022 | Kanegae et al. | |

FOREIGN PATENT DOCUMENTS

| | | | |
|---|---|---|---|
| CN | 109661311 | A | 4/2019 |
| JP | 2011213030 | A | 10/2011 |
| JP | 2013067111 | A | 4/2013 |
| JP | 2017065248 | A | 4/2017 |
| JP | 2019-209595 | A | 12/2019 |
| WO | 2016/111147 | A1 | 7/2016 |
| WO | 2019176211 | A1 | 9/2019 |

OTHER PUBLICATIONS

Office Action issued Jun. 16, 2026 in related Chinese Patent Application No. 202410567457.4.

* cited by examiner

LIQUID DISCHARGE HEAD, LIQUID DISCHARGE UNIT, AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2023-084945, filed on May 23, 2023, in the Japan Patent Office, the entire disclosure of which is hereby incorporated by reference herein.

BACKGROUND

Technical Field

Embodiments of the present disclosure relate to a liquid discharge head, a liquid discharge unit, and a liquid discharge apparatus.

Related Art

In the related art, a liquid discharge head includes multiple pressure chambers, a common supply channel, a common collection channel, and a communication channel. The multiple pressure chambers respectively communicate with multiple nozzles from which a liquid is discharged. The common supply channel communicates with the multiple pressure chambers. The common collection channel communicates with the multiple pressure chambers. The liquid flows from the common supply channel to the common collection channel through the pressure chambers or flows from the common supply channel to the common collection channel through the communication channel without passing through the pressure chambers.

SUMMARY

Embodiments of the present disclosure describe an improved liquid discharge head that includes a nozzle plate, a channel plate, and a common channel substrate. The nozzle plate has multiple nozzles from each of which a liquid is dischargeable. The multiple nozzles are arrayed in a nozzle array direction. The channel plate has multiple pressure chambers arrayed in the nozzle array direction in a pressure chamber area. The multiple pressure chambers respectively communicate with the multiple nozzles. The common channel substrate has a common supply channel communicating with each of the multiple pressure chambers, a common collection channel communicating with each of the multiple pressure chambers, and a communication channel disposed outside the pressure chamber area in the nozzle array direction. The communication channel connects the common supply channel and the common collection channel outside the pressure chamber area and bypass the multiple pressure chambers.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
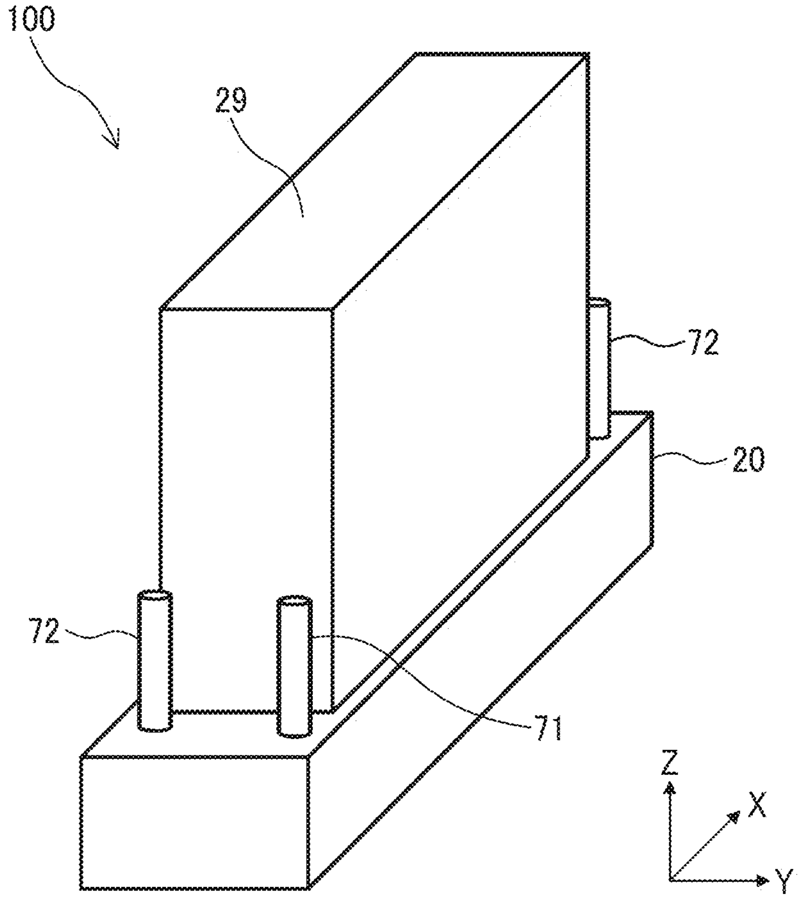
FIG. 1 is an external perspective view of a liquid discharge head according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the accompanying drawings.

First Embodiment

Figure 2:
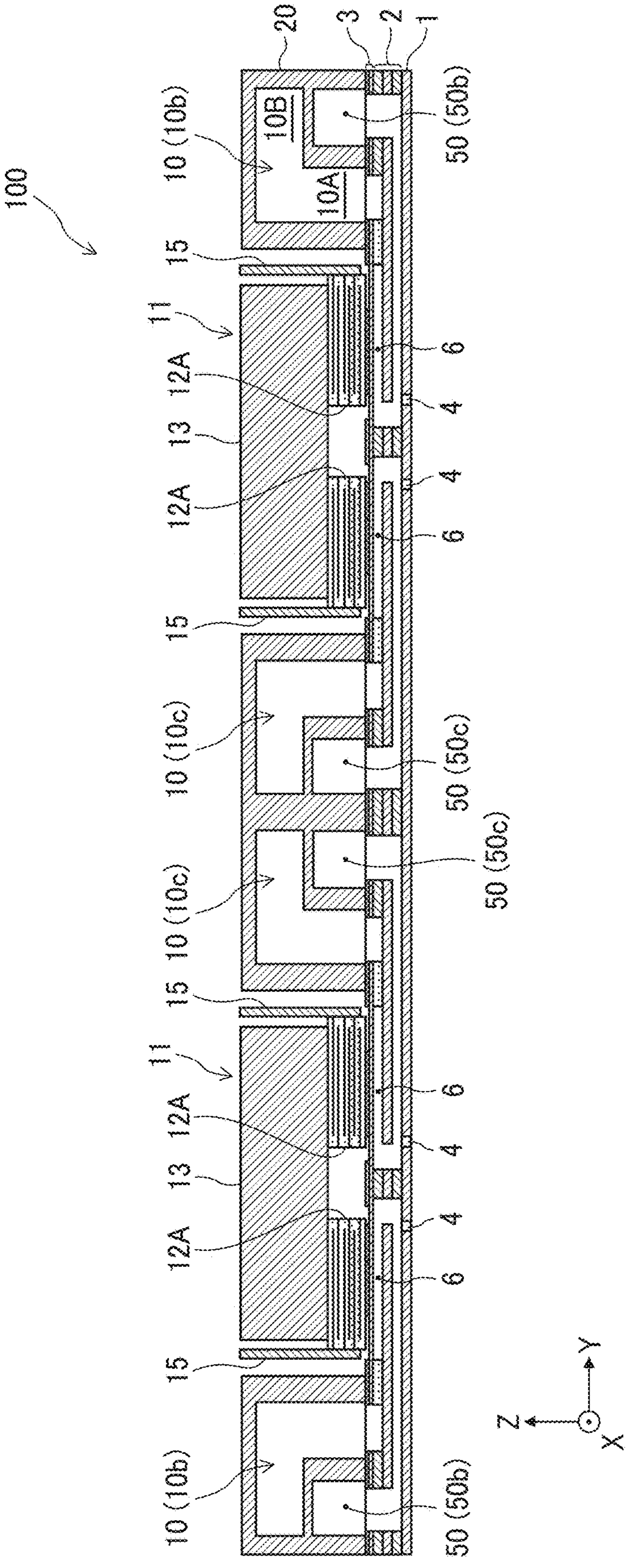
FIG. 2 is a cross-sectional view of the liquid discharge head of FIG. 1 in a head transverse direction (pressure-chamber longitudinal direction) orthogonal to a head longitudinal direction (nozzle array direction) of the liquid discharge head.
Figure 3:
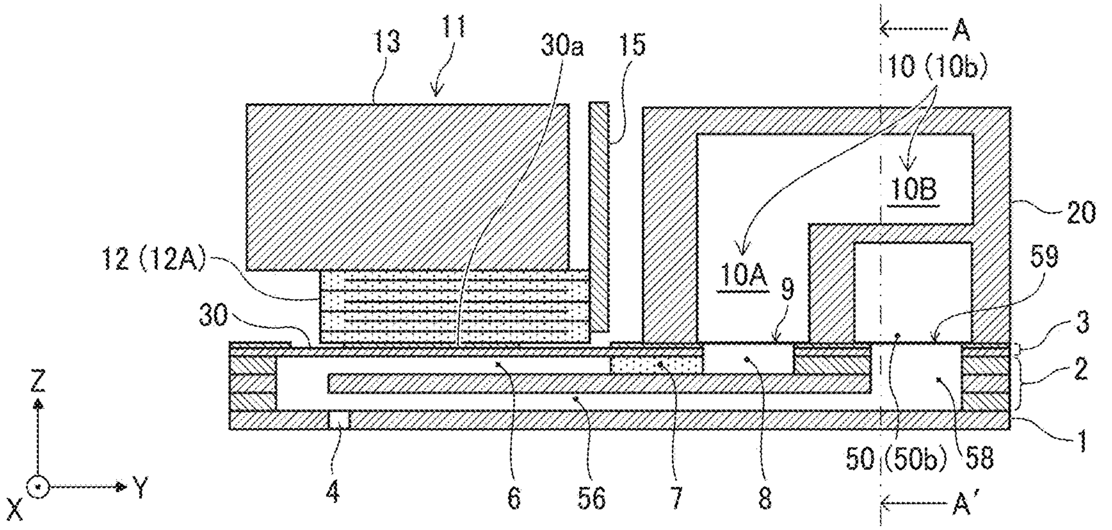
FIG. 3 is an enlarged cross-sectional view of a portion of the liquid discharge head of FIG. 1 corresponding to one nozzle in the head transverse direction.
Figure 4:
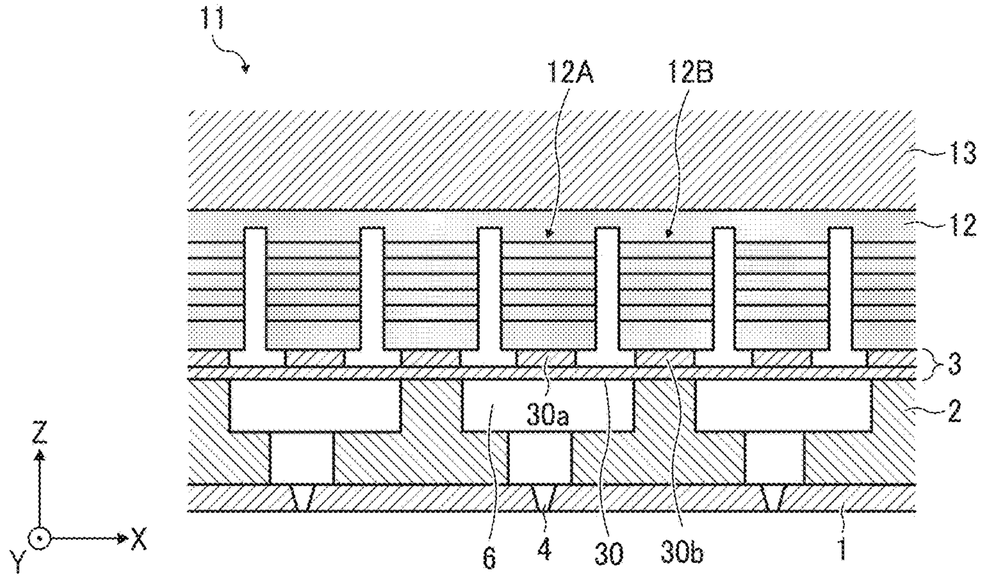
FIG. 4 is a partial cross-sectional view of the liquid discharge head of FIG. 1 in the head longitudinal direction along one nozzle row.

A liquid discharge head according to an embodiment of the present disclosure (referred to as a "first embodiment") will be described below. FIG. 1 is an external perspective view of a liquid discharge head 100 according to the first embodiment. FIG. 2 is a cross-sectional view of the liquid discharge head 100 according to the first embodiment in a head transverse direction (pressure-chamber longitudinal direction) orthogonal to a head longitudinal direction (nozzle array direction) of the liquid discharge head 100. FIG. 3 is an enlarged cross-sectional view of a portion of the liquid discharge head 100 according to the first embodiment, corresponding to one nozzle 4 in the head transverse direction. FIG. 4 is a partial cross-sectional view of the liquid discharge head 100 according to the first embodiment in the head longitudinal direction along one nozzle row.

The liquid discharge head 100 includes a nozzle plate 1, a channel plate 2, and a diaphragm 3, which are laminated one on another and bonded to each other. The liquid discharge head 100 further includes a piezoelectric actuator 11 that displaces the diaphragm 3, a common channel substrate 20, and a cover 29. In the following description, the head longitudinal direction is an X direction, the head transverse direction is a Y direction, and a head height direction (direction normal to a nozzle face on which multiple nozzles are arrayed) is a Z direction.

The nozzle plate 1 has multiple nozzles 4 from which a liquid is discharged. The multiple nozzles 4 are arrayed in multiple rows in the head longitudinal direction (nozzle array direction), i.e., the X direction. In the first embodiment, the nozzle plate 1 has four nozzle rows in each of which the multiple nozzles 4 are arrayed in the head longitudinal direction (X direction).

The channel plate 2 has multiple pressure chambers 6 respectively communicating with the multiple nozzles 4, multiple supply-side fluid restrictors 7 respectively communicating with the pressure chambers 6, and multiple supply-side inlets 8 respectively communicating with the supply-side fluid restrictors 7. Each of the supply-side inlets 8 communicates with a common supply channel 10 defined by the common channel substrate 20 via a supply-side opening 9 formed in the diaphragm 3.

The diaphragm 3 defines a wall face of the pressure chamber 6 of the channel plate 2. The diaphragm 3 has, but is not limited to, a double-layer structure including a first layer forming a thin portion and a second layer forming a thick portion from the side of channel plate 2. The first layer includes the deformable vibration portion 30 positioned corresponding to the pressure chamber 6.

The piezoelectric actuator 11 includes an electromechanical transducer element as a driving device (an actuator device or a pressure generator device) to deform the vibration portion 30 of the diaphragm 3. The piezoelectric actuator 11 is disposed on a side of the diaphragm 3 opposite a side facing the pressure chamber 6. The piezoelectric actuator 11 includes a piezoelectric member 12 attached to a base 13. The piezoelectric member 12 is grooved by half-cut dicing to form a desired number of columnar piezoelectric elements 12A and 12B in a pectinate shape at predetermined intervals in one piezoelectric member 12.

In the present embodiment, the piezoelectric element 12A of the piezoelectric member 12 is driven by application of drive waveforms, and the piezoelectric element 12B is merely used as a support to which no drive waveform is applied. Alternatively, all of the piezoelectric elements 12A and 12B can be used as the piezoelectric element to be driven by application of drive waveforms. The piezoelectric element 12A is bonded to a projection 30*a* that is an island-shaped thick portion on the vibration portion 30 of the diaphragm 3. The piezoelectric element 12B is bonded to a projection 30*b* that is a thick portion of the diaphragm 3.

The piezoelectric member 12 includes piezoelectric layers and internal electrodes alternately laminated on each other. Each internal electrode is pulled out to the end face to form an external electrode. The external electrode is connected to a flexible wiring 15.

The channel plate 2 has multiple collection-side individual channels 56 respectively communicating with the pressure chambers 6 and multiple collection-side outlets 58 respectively communicating with the collection-side individual channels 56. Each of the collection-side outlets 58 communicates with a common collection channel 50 defined by the common channel substrate 20 via a collection-side opening 59 formed in the diaphragm 3.

The common channel substrate 20 defines (has) the common supply channel 10 and the common collection channel 50. A supply port 71 for supplying a liquid from an external circulation path communicates with the common supply channel 10, and a collection port 72 for collecting the liquid to the external circulation path communicates with the common collection channel 50.

In the liquid discharge head 100, for example, the voltage to be applied to the piezoelectric element 12A is lowered from a reference potential so that the piezoelectric element 12A contracts to move the vibration portion 30 of the diaphragm 3 upward in FIG. 3 to increase the volume of the pressure chamber 6. As a result, a liquid flows into the pressure chamber 6. Then, the voltage to be applied to the piezoelectric element 12A is increased to expand the piezoelectric element 12A in the direction of lamination (Z direction), and the vibration portion 30 of the diaphragm 3 is deformed in the direction toward the nozzle 4 to reduce the volume of the pressure chamber 6. As a result, the liquid in the pressure chamber 6 is pressurized and discharged from the nozzle 4.

Subsequently, the voltage applied to the piezoelectric element 12A is returned to the reference voltage to restore the vibration portion 30 of the diaphragm 3 to the initial position. As a result, the pressure chamber 6 expands to generate a negative pressure, and the liquid is supplied from the common supply channel 10 into the pressure chamber 6. After the vibration of the meniscus surface of the liquid in the nozzle 4 is attenuated and stabilized, the liquid discharge head 100 shifts to an operation for the next liquid discharge.

The liquid that is not discharged from the nozzle 4 is drained from the pressure chamber 6 to the common collection channel 50 via the collection-side individual channel 56, the collection-side outlet 58, and the collection-side opening 59. Then, the liquid is supplied again from the common collection channel 50 to the common supply channel 10 through the external circulation path. Even when the liquid is not discharged from the nozzle 4, the liquid flows from the common supply channel 10 to the common collection channel 50 and is supplied again to the common supply channel 10 through the external circulation path.

The method of driving the liquid discharge head is not limited to the above-described example (pull-push discharge). For example, pull discharge or push discharge may be performed in accordance with the way to apply a drive waveform.

Figure 5:
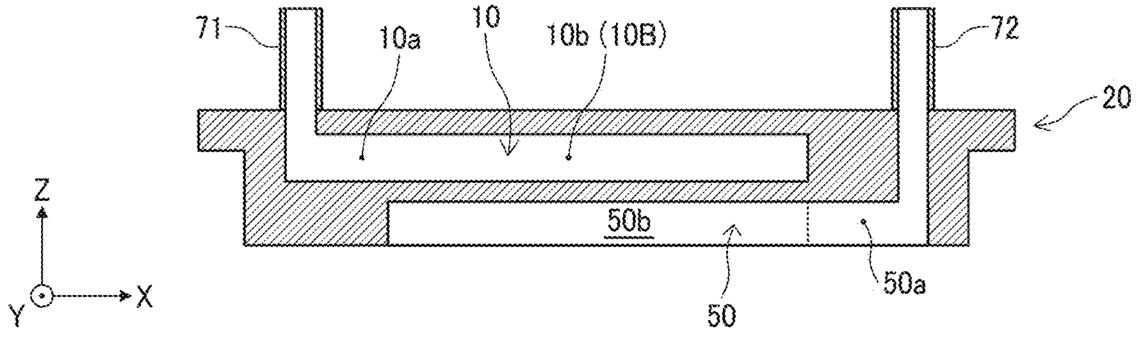
FIG. 5 is a cross-sectional view of a common channel substrate of the liquid discharge head of FIG. 3 taken along line A-A' in FIG. 3.
Figure 6:
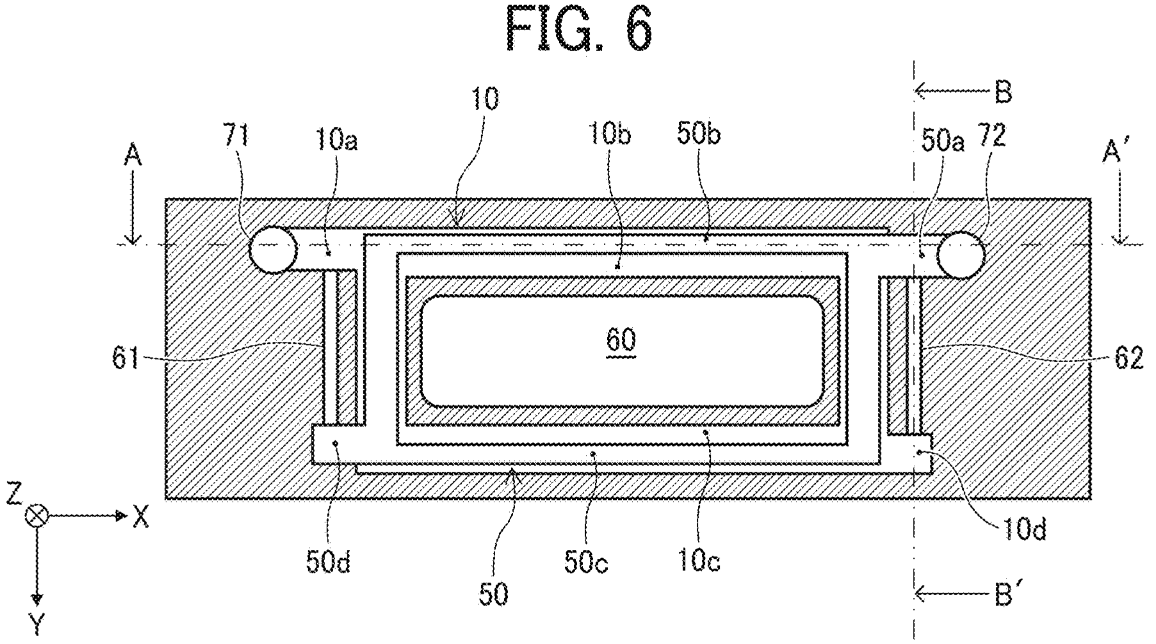
FIG. 6 is a transparent plan view of the common channel substrate of FIG. 5 as viewed from a nozzle plate side (lower side)
Figure 7:
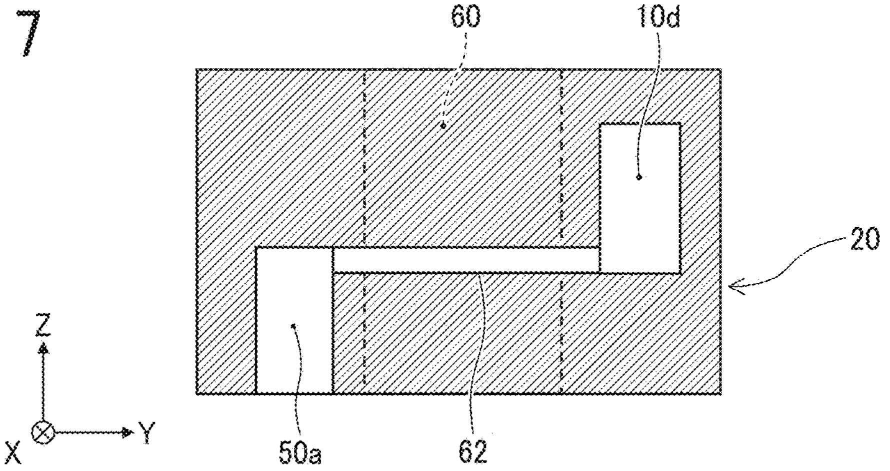
FIG. 7 is a cross-sectional view of the common channel substrate of FIG. 6 taken along line B-B' in FIG. 6.

The common supply channel 10 and the common collection channel 50 in the liquid discharge head 100 according to the first embodiment will be described below. FIG. 5 is a cross-sectional view of the common channel substrate 20 taken along line A-A' in FIG. 6. FIG. 6 is a transparent plan view of the common channel substrate 20 of FIG. 5 as viewed from the nozzle plate 1 side (lower side). FIG. 7 is a cross-sectional view of the common channel substrate 20 taken along line B-B' in FIG. 6.

In the first embodiment, an upper channel 10B, which is a part of the common supply channel 10, is disposed above the common collection channel 50 as illustrated in FIGS. 2 and 3. As illustrated in FIGS. 2 and 3, a lower channel 10A, which is another part of the common supply channel 10, is disposed at the same height (the same position in the Z direction) as the common collection channel 50 and closer to the nozzles 4 than the common collection channel 50 (on the left side of the common collection channel 50 in FIG. 3).

Alternatively, the arrangement of the common supply channel 10 and the common collection channel 50 may be reversed in the head transverse direction (Y direction), and the lower channel 10A, which is another part of the common supply channel 10, is disposed at the same height (the same position in the Z direction) as the common collection channel 50 and farther from the nozzles 4 than the common collection channel 50.

More specifically, the common supply channel 10 according to the first embodiment includes an inlet channel 10*a* disposed at one end (i.e., a first end) in the head longitudinal direction (pressure-chamber array direction) which is the left-and-right direction in FIG. 6 (X direction), a supply channel end 10*d* disposed at the other end (i.e., a second end) in the head longitudinal direction, and two branch channels 10*b* and 10*c*, between the inlet channel 10*a* and the supply channel end 10*d*, that are branched from the inlet channel 10*a* and joined to the supply channel end 10*d*.

The common supply channel 10 according to the first embodiment is connected to the supply-side inlets 8 of the pressure chambers 6 communicating with the multiple nozzles 4 forming the corresponding nozzle row, in connection channel portions, which is extending in the head longitudinal direction (X direction), of the two branch channels 10*b* and 10*c*. In other words, in an area (pressure chamber area 60) in FIG. 6, two nozzle rows are arranged in the head transverse direction, and the pressure chambers 6 corresponding to the two nozzle rows are arrayed in the head longitudinal direction. The head transverse direction is the up-and-down direction in FIG. 6 (Y direction), and the head longitudinal direction is the nozzle array direction (X direction). The supply-side inlets 8 of the pressure chambers 6 corresponding to the nozzle row on the upper side in FIG. 6 are connected to the connection channel portion of the branch channel 10*b* on the upper side in FIG. 6, and the supply-side inlets 8 of the pressure chambers 6 corresponding to the nozzle row on the lower side in FIG. 6 are connected to the connection channel portion of the branch channel 10*c* on the lower side in FIG. 6.

On the other hand, the common collection channel 50 according to the first embodiment includes a drain channel 50*a* disposed at the second end in the head longitudinal direction (pressure-chamber array direction), which is the left-and-right direction in FIG. 6 (X direction), a collection channel end 50*d* disposed at the first end in the head longitudinal direction, and two branch channels 50*c* and 50*b*, between the drain channel 50*a* and the collection channel end 50*d*, that are branched from the collection channel end 50*d* and joined to the drain channel 50*a*.

The common collection channel 50 according to the first embodiment is connected to the collection-side outlets 58 of the pressure chambers 6 communicating with the multiple nozzles 4 forming the corresponding nozzle row, in connection channel portions, which is extending in the head longitudinal direction (X direction), of the two branch channels 50*b* and 50*c*. In other words, in the area (pressure chamber area 60) in FIG. 6, the collection-side outlets 58 of the pressure chambers 6 corresponding to the nozzle row on the upper side in FIG. 6 are connected to the connection channel portion of the branch channel 50*b* on the upper side in FIG. 6, and the collection-side outlets 58 of the pressure chambers 6 corresponding to the nozzle row on the lower side in FIG. 6 are connected to the connection channel portion of the branch channel 50*c* on the lower side FIG. 6.

Liquid supplied from the supply port 71 to the inlet channel 10*a* of the common supply channel 10 flows into the two branch channels 10*b* and 10*c*. Then, the liquid is supplied from the connection channel portions of the branch channels 10*b* and 10*c* of the common supply channel 10 to the pressure chambers 6 via the supply-side inlets 8. The liquid that is not discharged from the nozzles 4 and is collected from the pressure chambers 6 flows from the collection-side outlets 58 to the drain channel 50*a* via the connection channel portions of the branch channels 50*b* and 50*c* of the common collection channel 50. Subsequently, the liquid is collected to the collection port 72 connected to the drain channel 50*a*.

In the circulation type liquid discharge head in which liquid is circulated through the common supply channel 10 and the common collection channel 50, the common supply channel 10 and the common collection channel 50 may not increase the cross-sectional areas thereof or may not be laid out with low channel resistance due to, for example, the restriction on the head dimensions. Accordingly, the channel resistance of the common supply channel 10 and the common collection channel 50 may increase, and a pressure, such as a positive pressure applied to the liquid in the supply port 71 (positive pressure applied to the common supply channel 10) or a negative pressure applied to the liquid in the collection port 72 (negative pressure applied to the common collection channel 50) may become large in order to appropriately circulate the liquid. As a result, it is difficult to appropriately circulate the liquid in the liquid discharge head 100 through the common supply channel 10 and the common collection channel 50.

For this reason, in the first embodiment, as illustrated in FIGS. 6 and 7, communication channels 61 and 62 are provided in order to allow liquid to flow from the common supply channel 10 to the common collection channel 50 without passing through the pressure chamber 6. Due to such a configuration, even if the positive pressure applied to the liquid in the supply port 71 and the negative pressure applied to the liquid in the collection port 72 are small, the communication channels 61 and 62 can circulate the liquid to collect the liquid supplied from the supply port 71, from the collection port 72.

For example, a communication channel that allows the liquid to flow from the common supply channel 10 to the common collection channel 50 without passing through the pressure chamber 6 may be disposed at a position overlapping the pressure chamber area 60 in the head longitudinal direction (pressure-chamber array direction), which is the X direction. However, the communication channel disposed at this position connects the connection channel portions, which are connected to the pressure chambers 6, of the branch channels 10*b* and 10*c* of the common supply channel 10 and the connection channel portions, which are connected to the pressure chambers 6, of the branch channels 50*b* and 50*c* of the common collection channel 50. In this case, since the flow of the liquid flowing through the communication channel is likely to affect the pressure chambers 6, the channel resistance of the communication channel may not be reduced in consideration of this effect.

In addition, the position where the communication channel is disposed, which is the area on the side of the pressure chamber area 60 in the head transverse direction (Y direction), typically does not have sufficient space. As a result, for example, the degree of freedom in the dimensions of the communication channel and the degree of freedom in the layout of the communication channel are low, and the channel resistance of the communication channel may not sufficiently be reduced.

Accordingly, in such a configuration in which the communication channel is disposed at a position overlapping the pressure chamber area 60 in the head longitudinal direction (pressure-chamber array direction) which is the X direction, it is difficult to obtain sufficient liquid circulation property since the channel resistance of the communication channel may not sufficiently be reduced.

In the present embodiment, as illustrated in FIG. 6, the communication channels 61 and 62 are disposed at a position outside the pressure chamber area 60 in the head longitudinal direction (pressure-chamber array direction) which is the X direction.

Since this position is the area outside the pressure chamber area 60 in the head longitudinal direction, this area has sufficient space as compared with the area on the side of the pressure chamber area 60 in the head transverse direction (Y direction), and thus, for example, the degree of freedom in the dimensions of the communication channels 61 and 62 and the degree of freedom in the layout of the communication channels 61 and 62 are high.

When the communication channel is disposed at this position, the communication channels 61 and 62 can be connected to a channel portion other than the connection channel portions, which are connected to the pressure chambers 6, of the branch channels 10*b* and 10*c* of the common supply channel 10 and the connection channel portions, which are connected to the pressure chambers 6, of the branch channels 50*b* and 50*c* of the common collection channel 50. Specifically, the communication channel 61 on one side connects the inlet channel 10*a* of the common supply channel 10 and the collection channel end 50*d* of the common collection channel 50, which are the channel portion other than the connection channel portions connected to the pressure chambers 6. The communication channel 62 on the other side connects the supply channel end 10*d* of the common supply channel 10 and the drain channel 50*a* of the common collection channel 50, which are the channel portion other than the connection channel portions connected to the pressure chambers 6. Accordingly, since the flow of the liquid flowing through the communication channels 61 and 62 is unlikely to affect the pressure chambers 6, the setting of the channel resistance of the communication channels 61 and 62 is not hindered by the effect of this flow.

As described above, according to the first embodiment, for example, the degree of freedom in the dimensions of the communication channels 61 and 62 and the degree of freedom in the layout of the communication channels 61 and 62 are high, and the flow of the liquid flowing through the communication channels 61 and 62 is unlikely to affect the pressure chambers 6. As a result, the restriction on the formation of the communication channels 61 and 62 is reduced, the channel resistance of the communication channels 61 and 62 can be sufficiently small, and thus the liquid circulation property can be high. In addition, the enhanced liquid circulation property also enhances bubble purge property to purge, for example, bubbles together with the liquid from the liquid discharge head 100.

In particular, the communication channel 61 according to the first embodiment connects the inlet channel 10*a* of the common supply channel 10 and the collection channel end 50*d* of the common collection channel 50. Liquid is likely to stagnate in the collection channel end 50*d* (i.e., a stagnation portion), which is the upstream portion of the liquid flowing through the common collection channel 50. According to the first embodiment, liquid flows from the common supply channel 10 into the collection channel end 50*d* (i.e., the stagnation portion) via the communication channel 61 and flows through the common collection channel 50 toward the drain channel 50*a*. As a result, the liquid is unlikely to stagnate in the collection channel end 50*d* (i.e., the stagnation portion), and the liquid can be circulated throughout the liquid discharge head 100 as desired. As a result, the bubble purge property is also enhanced.

In addition, since the inlet channel 10*a* of the common supply channel 10 is a portion to which a large positive pressure for circulating the liquid is applied, the flow of the liquid in the communication channel 61 connected to the inlet channel 10*a* is relatively strong. Accordingly, since the relatively strong flow of the liquid can also be generated in the collection channel end 50*d* to which the communication channel 61 is connected, the stagnation of liquid can be more effectively prevented in the collection channel end 50*d*, and the bubble purge property is also enhanced.

The communication channel 62 according to the first embodiment connects the supply channel end 10*d* of the common supply channel 10 and the drain channel 50*a* of the common collection channel 50. Liquid is likely to stagnate in the supply channel end 10*d* (i.e., the stagnation portion), which is the downstream portion of the liquid flowing through the common supply channel 10. According to the first embodiment, liquid in the supply channel end 10*d* of the common supply channel 10 (i.e., the stagnation portion) flows to the drain channel 50*a* via the communication channel 62.

As a result, the liquid is unlikely to stagnate in the supply channel end 10*d* (i.e., the stagnation portion), and the liquid can be circulated throughout the liquid discharge head 100 as desired. As a result, the bubble purge property is also enhanced.

In addition, since the drain channel 50*a* of the common collection channel 50 is a portion to which a large negative pressure for circulating the liquid is applied, the flow of the liquid in the communication channel 62 connected to the drain channel 50*a* is relatively strong. Accordingly, since the relatively strong flow of the liquid can also be generated in the supply channel end 10*d* to which the communication channel 62 is connected, the stagnation of liquid can be more effectively prevented in the supply channel end 10*d*, and the bubble purge property is also enhanced.

In the first embodiment, since the two communication channels 61 and 62 are disposed as described above, the liquid flows at balanced flow rates through the connection channel portions of the two branch channels 10*b* and 10*c* of the common supply channel 10. Accordingly, a difference in liquid discharge between the nozzle rows corresponding to the two branch channels 10*b* and 10*c* is unlikely to occur.

In the first embodiment, as illustrated in FIG. 3, a part (the upper channel 10B) of the common supply channel 10 is disposed above the common collection channel 50, but embodiments of the present disclosure are not limited thereto. For example, as illustrated in FIG. 8, an upper channel 50B, which is a part of the common collection channel 50, may be disposed above the common supply channel 10.

In addition, in the first embodiment, as illustrated in FIG. 3, another part (the lower channel 10A) of the common supply channel 10 is disposed at the same height (the same position in the Z direction) as the common collection channel 50 and closer to the nozzle 4 than the common collection channel 50 (on the left side of the common collection channel 50 in FIG. 3), but embodiments of the present disclosure are not limited thereto.

Figure 8:
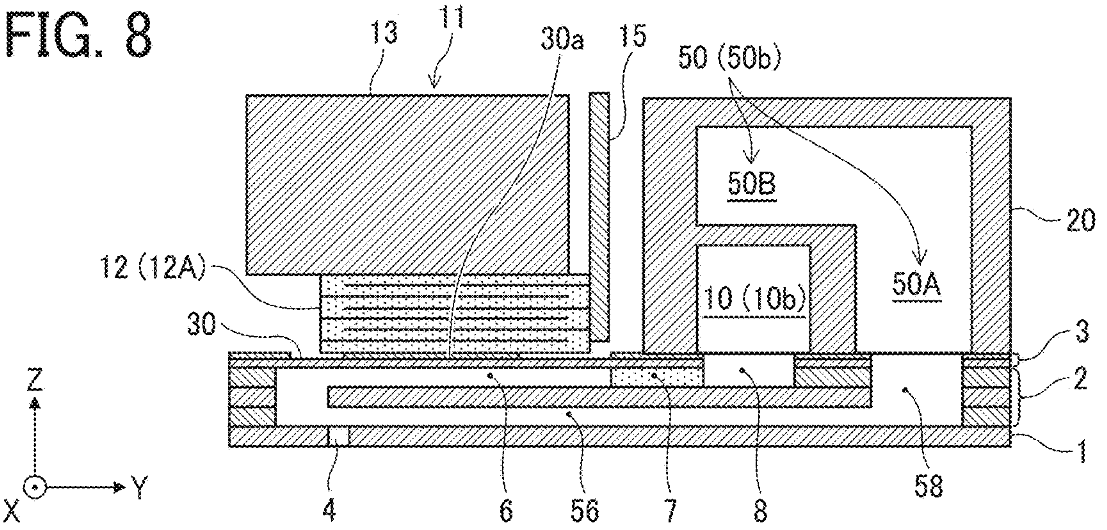
FIG. 8 is an enlarged cross-sectional view of a liquid discharge head in the head transverse direction, in which a part of a common collection channel is disposed above a common supply channel, according to a third embodiment of the present disclosure.

For example, as illustrated in FIG. 8, a lower channel 50A, which is another part of the common collection channel 50, may be disposed at the same height (the same position in the Z direction) as the common supply channel 10 and farther from the nozzles 4 than the common supply channel 10 (on the right side of the common supply channel 10 in FIG. 8). Alternatively, the arrangement of the common supply channel 10 and the common collection channel 50 may be reversed in the head transverse direction (Y direction), and the lower channel 50A, which is another part of the common collection channel 50, is disposed at the same height (the same position in the Z direction) as the common supply channel 10 and closer to the nozzles 4 than the common supply channel 10.

Second Embodiment

Figure 9:
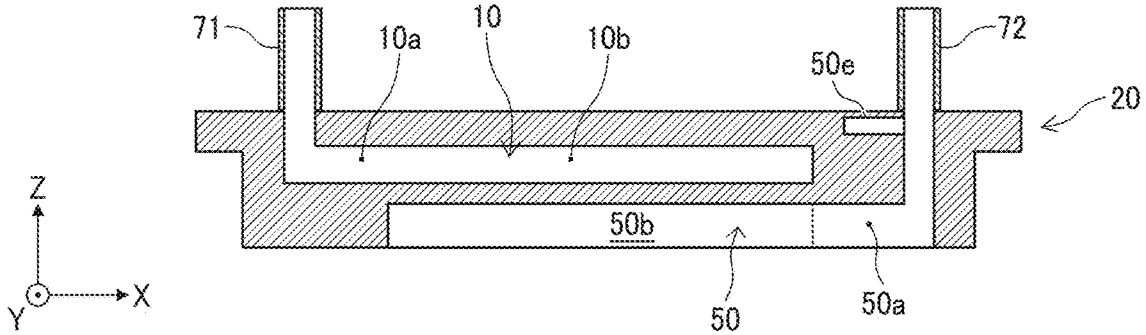
FIG. 9 is a cross-sectional view of a common channel substrate taken along line C-C' in FIG. 10, according to a second embodiment of the present disclosure.
Figure 10:
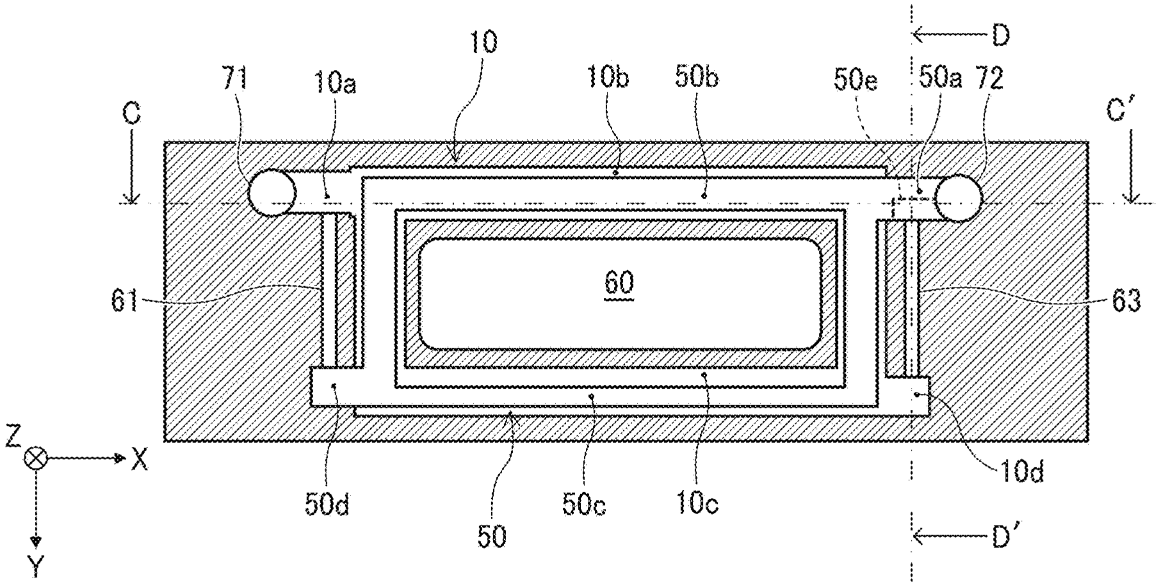
FIG. 10 is a transparent plan view of the common channel substrate of FIG. 9 as viewed from the nozzle plate side (lower side)
Figure 11:
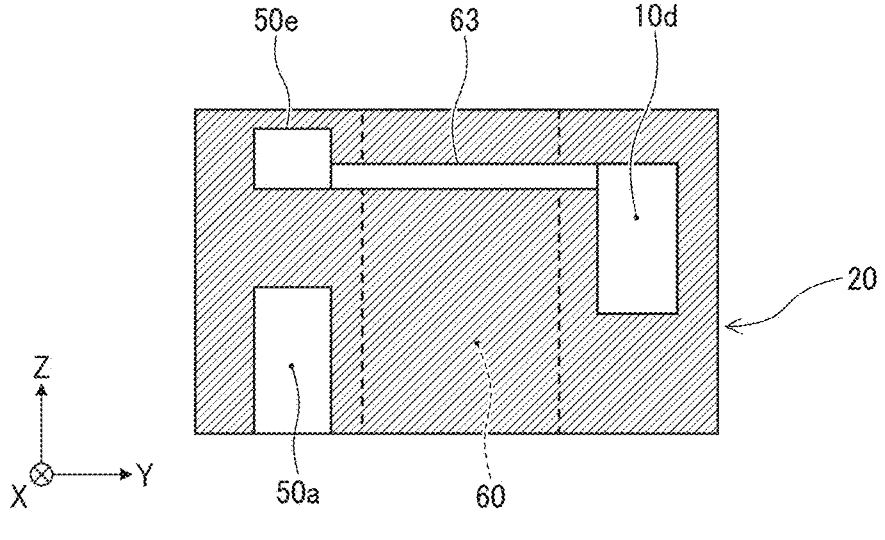
FIG. 11 is a cross-sectional view of the common channel substrate of FIG. 10 taken along line D-D' in FIG. 10.

A liquid discharge head according to another embodiment of the present disclosure (referred to as a "second embodiment") will be described below. In the second embodiment, the arrangement of the communication channel 62 is changed from the arrangement according to the first embodiment. FIG. 9 is a cross-sectional view of a common channel substrate 20 taken along line C-C' in FIG. 10, according to the second embodiment. FIG. 10 is a transparent plan view of the common channel substrate 20 of FIG. 9 as viewed from the nozzle plate 1 side (lower side), according to the second embodiment. FIG. 11 is a cross-sectional view of the common channel substrate 20 of FIG. 10 taken along line D-D' in FIG. 10, according to the second embodiment.

In the second embodiment, as illustrated in FIG. 10, two communication channels 61 and 63 are provided in order to allow liquid to flow from the common supply channel 10 to the common collection channel 50 without passing through the pressure chamber 6. The two communication channels 61 and 63 are both disposed at positions outside the pressure chamber area 60 in the head longitudinal direction (pressure-chamber array direction) which is the X direction. As a result, similarly to the first embodiment, the restriction on the formation of the communication channels 61 and 63 is reduced, and the channel resistance of the communication channels 61 and 63 can be sufficiently small. Thus, the liquid circulation property can be high, and the bubble purge property is enhanced.

In the second embodiment, the arrangement of the communication channel 63 connecting the supply channel end 10*d* of the common supply channel 10 and the drain channel 50*a* of the common collection channel 50 is different from the arrangement according to the first embodiment described above. Specifically, the communication channel 62 according to the first embodiment is connected to the lower portion of the supply channel end 10*d* as illustrated in FIG. 7, and the communication channel 63 according to the second embodiment is connected to the upper portion of the supply channel end 10*d* as illustrated in FIG. 11. Since bubbles in the common supply channel 10 accumulate in the upper portion of the common supply channel 10 due to buoyancy, the communication channel 63 connected to the upper portion of the supply channel end 10*d* as in the second embodiment facilitates the purge of the bubbles in the common supply channel 10.

In the second embodiment, the drain channel 50*a* of the common collection channel 50 is not disposed at the same height (the same position in the Z direction) as the height position of the upper portion of the supply channel end 10*d* to which the inlet of the communication channel 63 is connected. In the second embodiment, in addition to the drain channel 50*a* of the common collection channel 50, the common collection channel 50 has a second drain channel 50*e* to which the collection port 72 is connected is disposed at the same height (the same position in the Z direction) as the height position of the upper portion of the supply channel end 10*d* to which the inlet of the communication channel 63 is connected. The communication channel 63 is connected to the second drain channel 50*e*. As a result, the outlet of the communication channel 63 is not lower than the inlet, the bubbles accumulating in the upper portion of the channel due to buoyancy can be conveyed by the flow of the liquid, and thus the bubble purge property is enhanced.

Third Embodiment

Figure 12:
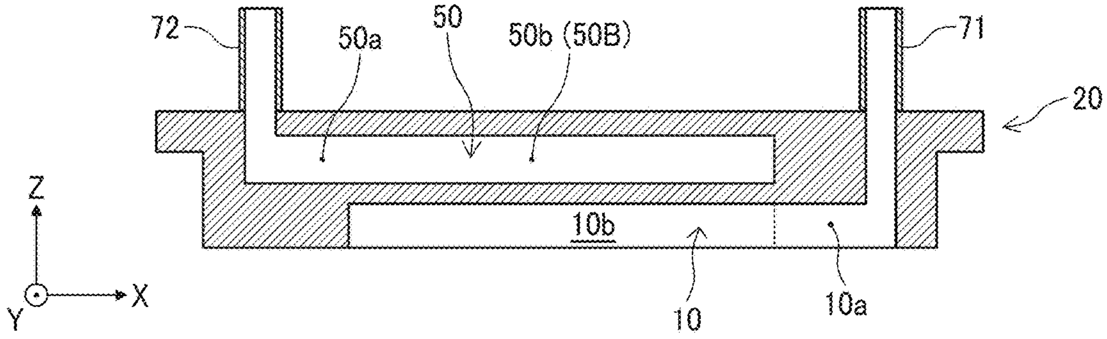
FIG. 12 is a cross-sectional view of a common channel substrate taken along line E-E' in FIG. 13, according to the third embodiment.
Figure 13:
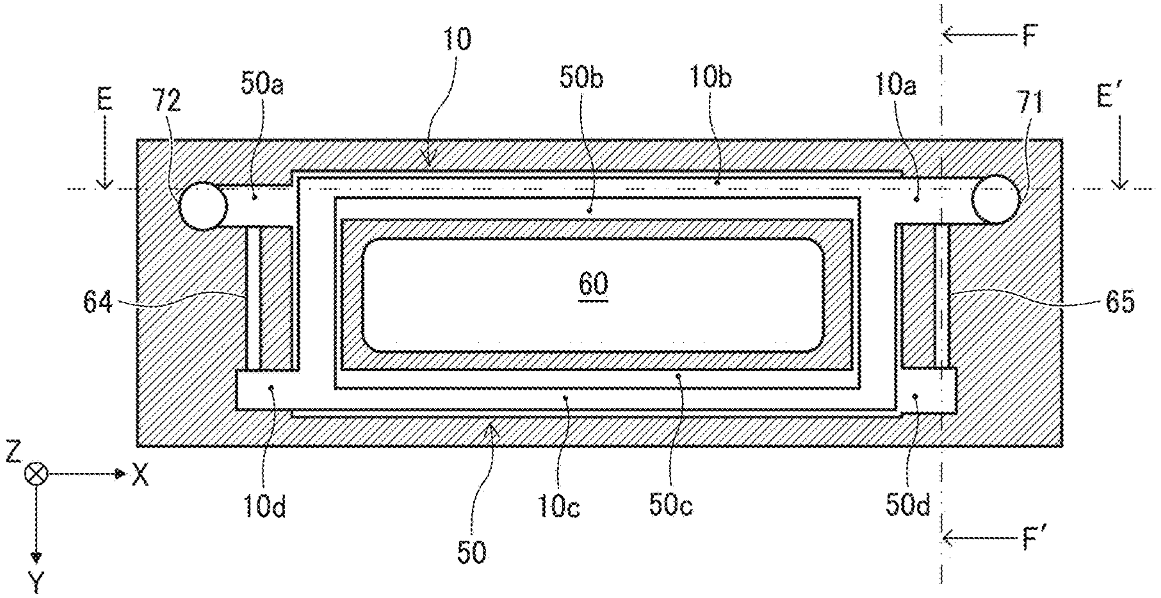
FIG. 13 is a transparent plan view of the common channel substrate of FIG. 12 as viewed from the nozzle plate side (lower side)
Figure 14:
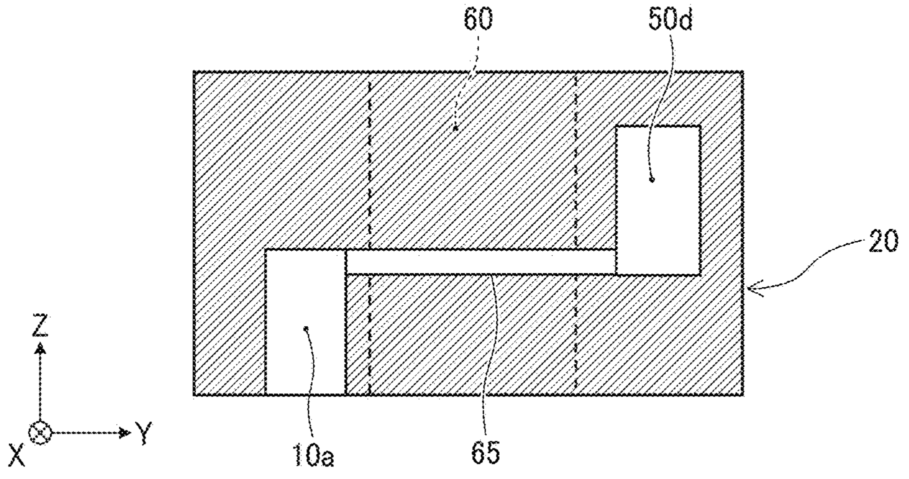
FIG. 14 is a cross-sectional view of the common channel substrate of FIG. 13 taken along line D-D' in FIG. 13.

A liquid discharge head according to still another embodiment of the present disclosure (referred to as a "third embodiment") will be described below. In the third embodiment, contrary to the first embodiment, as illustrated in FIG. 8, the upper channel 50B, which is a part of the common collection channel 50, is disposed above the common supply channel 10. FIG. 12 is a cross-sectional view of a common channel substrate 20 taken along line E-E' in FIG. 13, according to the third embodiment. FIG. 13 is a transparent plan view of the common channel substrate 20 of FIG. 12 as viewed from the nozzle plate 1 side (lower side), according to the third embodiment. FIG. 14 is a cross-sectional view of the common channel substrate 20 of FIG. 13 taken along line F-F' in FIG. 13, according to the third embodiment.

In the third embodiment, as illustrated in FIG. 13, two communication channels 64 and 65 are provided in order to allow liquid to flow from the common supply channel 10 to the common collection channel 50 without passing through the pressure chamber 6. The two communication channels 64 and 65 are both disposed at positions outside the pressure chamber area 60 in the head longitudinal direction (pressure-chamber array direction) which is the X direction. As a result, similarly to the first embodiment, the restriction on the formation of the communication channels 64 and 65 is reduced, and the channel resistance of the communication channels 64 and 65 can be sufficiently small. Thus, the liquid circulation property can be high, and the bubble purge property is enhanced.

In the third embodiment, as illustrated in FIG. 8, the upper channel 50B which is a part of the common collection channel 50 is disposed above the common supply channel 10, and the positional relation between the common collection channel 50 and the common supply channel 10 is reversed as compared to the first embodiment described above. Such a configuration allows the outlet of the communication channel 65 to be disposed at the same height as or higher than the inlet of the communication channel 65. Accordingly, the communication channel 65 can be formed as a horizontal channel or an ascending channel from the inlet toward the outlet, and the bubbles accumulating in the upper portion of the channel are easily conveyed by the flow of the liquid due to buoyancy, and thus the bubble purge property is high. The same applies to the communication channel 64.

As in the third embodiment, the upper channel 50B of the common collection channel 50 disposed above the common supply channel 10 allows the communication channel 65 to be connected to the upper portion of the inlet channel 10*a* as illustrated in FIG. 14. Since bubbles in the common supply channel 10 accumulate in the upper portion of the common supply channel 10 due to buoyancy, the communication channel 65 connected to the upper portion of the inlet channel 10*a* as in the third embodiment facilitates the purge of the bubbles in the common supply channel 10. The same applies to the communication channel 64.

Figure 15:
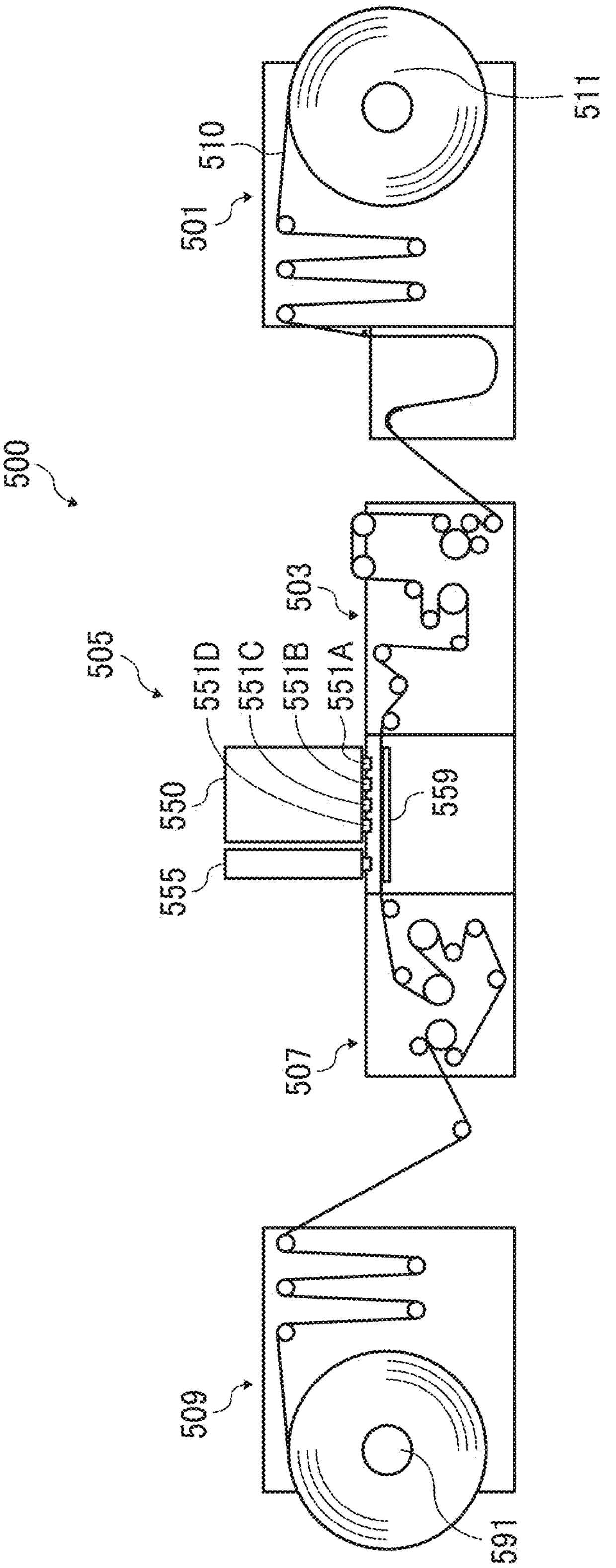
FIG. 15 is a schematic view of a liquid discharge apparatus according to an embodiment of the present disclosure.
Figure 16:
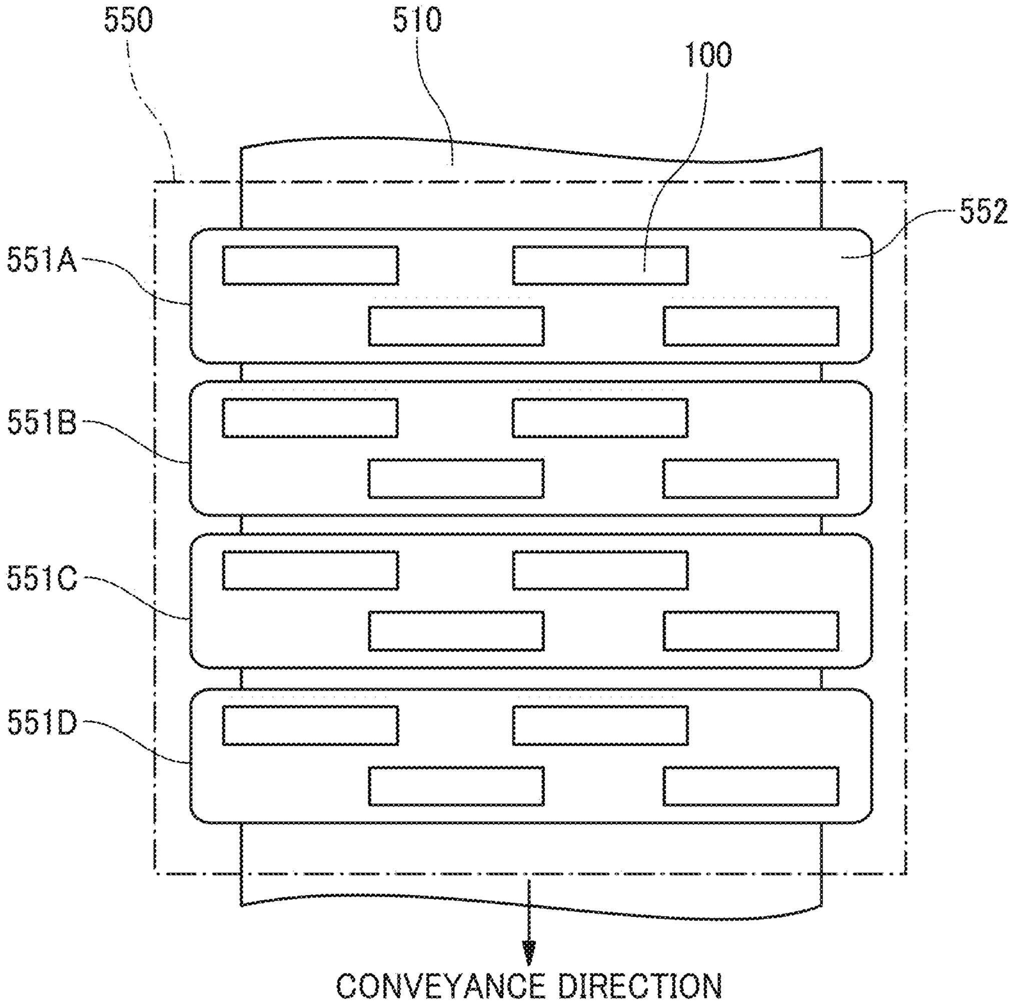
FIG. 16 is a plan view of a head unit of the liquid discharge apparatus of FIG. 15.

An example of a liquid discharge apparatus according to an embodiment of the present disclosure is described below with reference to FIGS. 15 and 16. FIG. 15 is a schematic view of the liquid discharge apparatus. FIG. 16 is a plan view of a head unit of the liquid discharge apparatus.

A printer 500 as the liquid discharge apparatus according to the present embodiment includes a feeder 501 to feed a continuous medium 510, a guide conveyor 503 to guide and convey the continuous medium 510, fed from the feeder 501, to a printing unit 505, the printing unit 505 to discharge a liquid onto the continuous medium 510 to form an image on the continuous medium 510, a dryer 507 to dry the continuous medium 510, and a carrier 509 to feeds the dried continuous medium 510 outward.

The continuous medium 510 (i.e., a medium) is fed from a winding roller 511 of the feeder 501, guided and conveyed with rollers of the feeder 501, the guide conveyor 503, the dryer 507, and the carrier 509 (i.e., a conveyor), and wound around a take-up roller 591 of the carrier 509.

In the printing unit 505, the continuous medium 510 is conveyed on a conveyance guide 559 so as to face a head unit 550 and a head unit 555. An image is formed with liquid discharged from the head unit 550, and post-treatment is performed with treatment liquid discharged from the head unit 555.

The head unit 550 includes, for example, full-line head arrays 551A, 551B, 551C, and 551D for four colors from the upstream side in a conveyance direction of the continuous medium 510. The full-line head arrays 551A, 551B, 551C, and 551D may be referred to simply as the "head array 551" when colors are not distinguished.

Each of the head arrays 551 is a liquid discharger to discharge liquid of black (K), cyan (C), magenta (M), or yellow (Y) onto the continuous medium 510 conveyed in the conveyance direction. The number and types of colors are not limited to the above-described four colors of K, C, M, and Y and may be any other suitable number and types.

In each head array 551, for example, as illustrated in FIG. 16, the liquid discharge heads 100 according to the present embodiment are disposed in a staggered arrangement on a base 552 to form the head array 551. The configuration of the head array 551 is not limited to such a configuration. The liquid discharge head 100 according to the present embodiment may be referred to simply as the "head 100" in the following descriptions.

Figure 17:
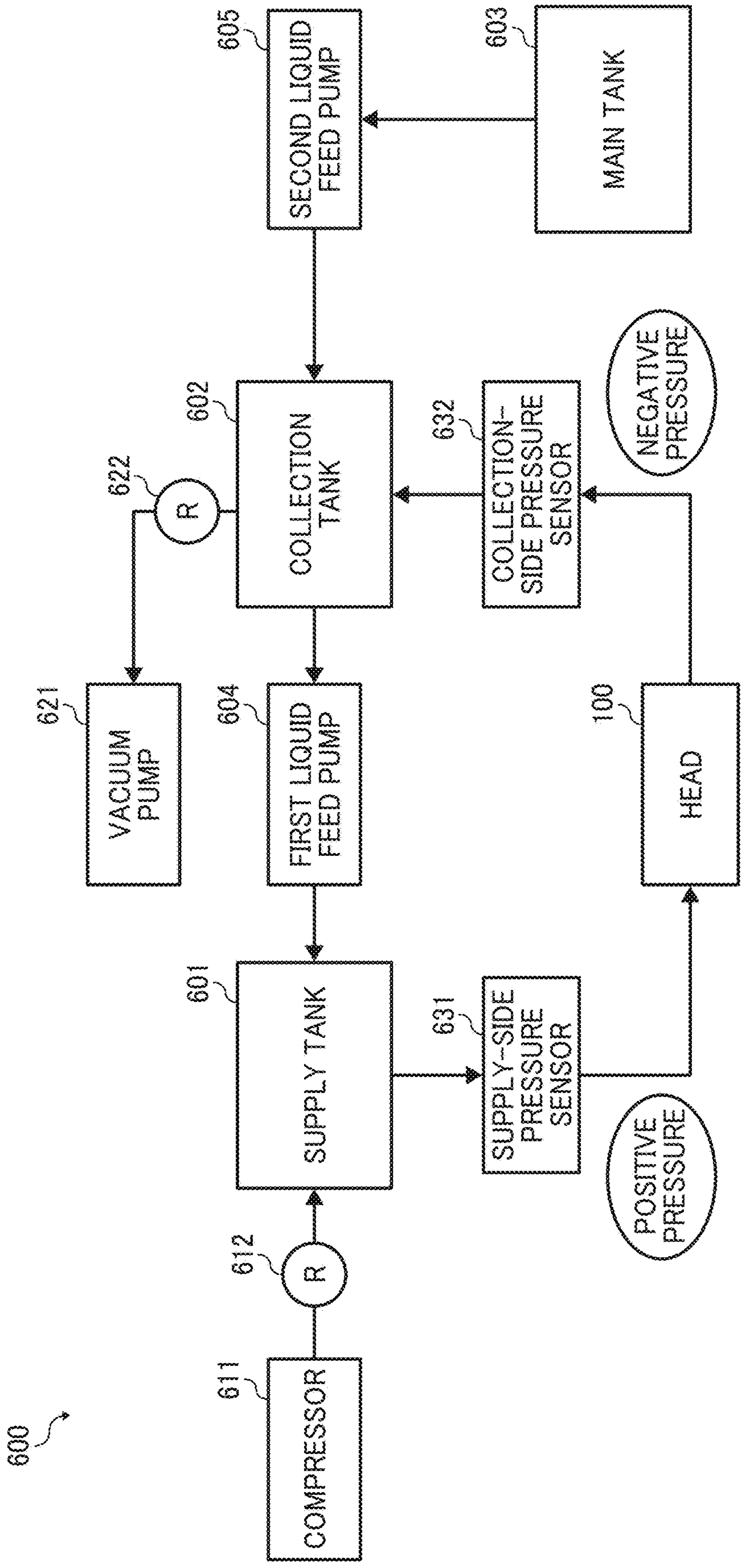
FIG. 17 is a block diagram of a liquid circulation device according to an embodiment of the present disclosure.

FIG. 17 illustrates an example of a liquid circulation device 600 employed in the printer 500. FIG. 17 is a block diagram of the liquid circulation device 600. Although only one head 100 is illustrated in FIG. 17, in the structure including multiple heads 100 as illustrated in FIG. 16, multiple supply-side channels and multiple collection-side channels are respectively connected via, for example, manifolds to the supply-sides and collection sides of the multiple heads 100.

The liquid circulation device 600 includes a supply tank 601, a collection tank 602, a main tank 603, a first liquid feed pump 604, a second liquid feed pump 605, a compressor 611, a regulator 612, a vacuum pump 621, a regulator 622, a supply-side pressure sensor 631, and a collection-side pressure sensor 632. The compressor 611 and the vacuum pump 621 together generate a difference of pressure between the pressure in the supply tank 601 and the pressure in the collection tank 602.

The supply-side pressure sensor 631 is disposed between the supply tank 601 and the head 100 and coupled to the supply-side channel connected to the supply port 71 of the head 100. The collection-side pressure sensor 632 is disposed between the head 100 and the collection tank 602 and coupled to the collection-side channel connected to the collection port 72 of the head 100.

One end of the collection tank 602 is coupled to the supply tank 601 via the first liquid feed pump 604, and another end of the collection tank 602 is coupled to the main tank 603 via the second liquid feed pump 605.

Accordingly, liquid flows from the supply tank 601 into the head 100 through the supply port 71. Then, the liquid is collected from the collection port 72 to the collection tank 602 and is sent from the collection tank 602 to the supply tank 601 by the first liquid feed pump 604 so as to form a circulation path through which the liquid circulates.

The compressor 611 is coupled to the supply tank 601 and is controlled so that a predetermined positive pressure is detected by the supply-side pressure sensor 631. On the other hand, the vacuum pump 621 is coupled to the collection tank 602 and is controlled so that a predetermined negative pressure is detected by the collection-side pressure sensor 632.

Such a configuration allows the meniscus of liquid to be maintained at a constant negative pressure while circulating the liquid through the head 100.

When the liquid is discharged from the nozzles 4 of the head 100, the amount of liquid in each of the supply tank 601 and the collection tank 602 decreases. Accordingly, the second liquid feed pump 605 replenishes liquid from the main tank 603 to the collection tank 602 as appropriate. The timing of liquid replenishment from the main tank 603 to the collection tank 602 can be controlled based on, for example, the detection result of a liquid level sensor disposed in the collection tank 602. In such a case, for example, the liquid replenishment may be performed when the liquid level of the liquid in the collection tank 602 falls below a predetermined height.

Figure 18:
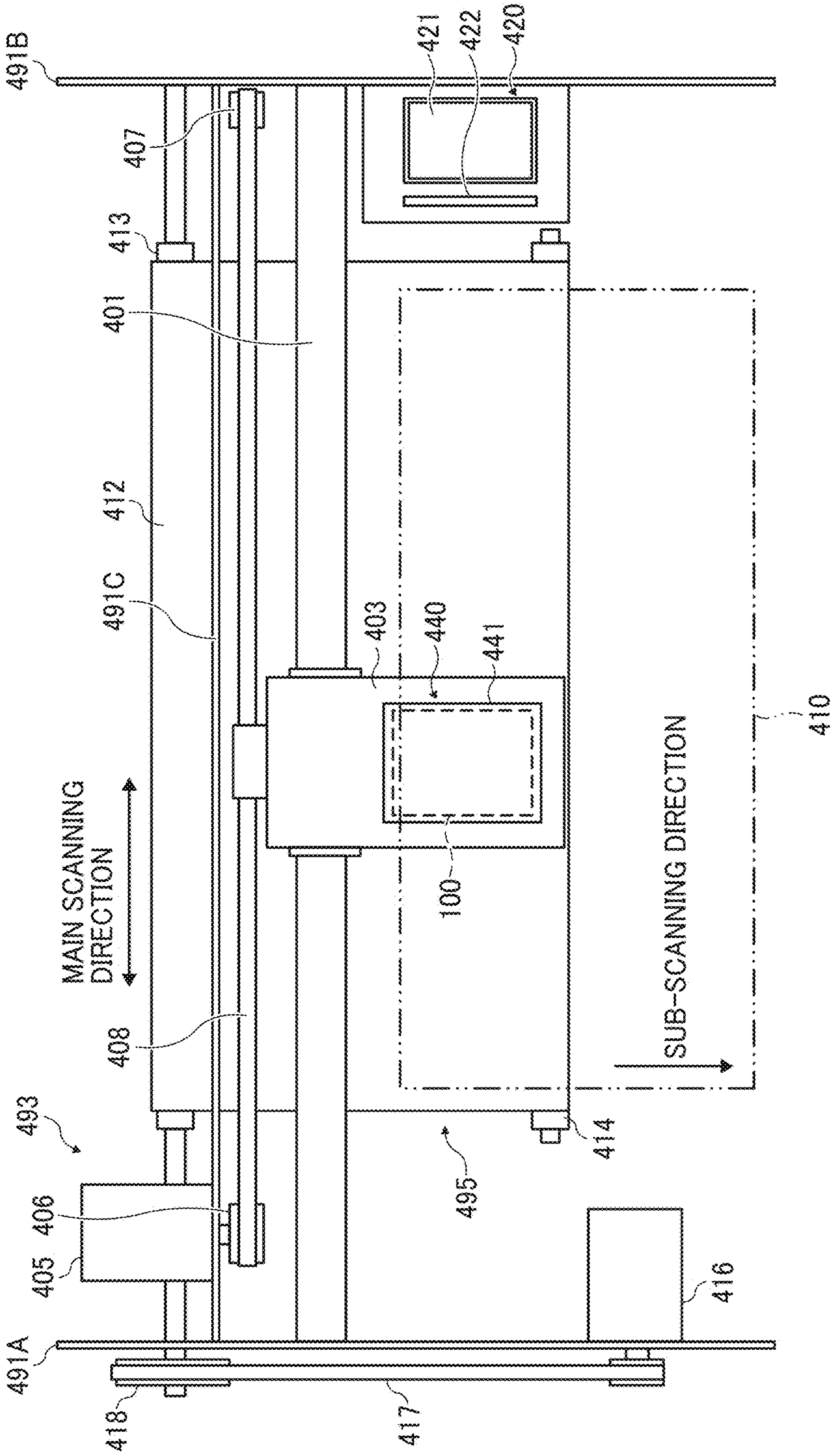
FIG. 18 is a schematic plan view of a part of another liquid discharge apparatus according to an embodiment of the present disclosure.
Figure 19:
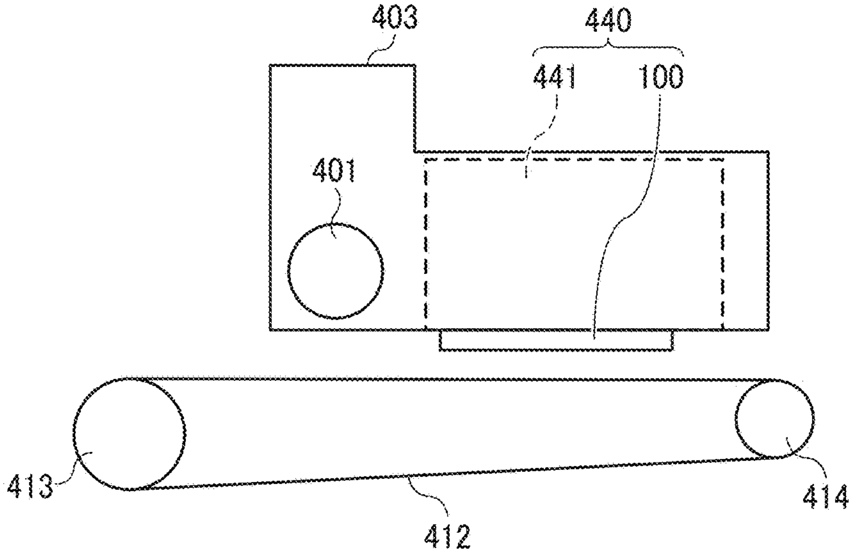
FIG. 19 is a schematic side view of the part of the liquid discharge apparatus of FIG. 18.

Another example of the printer 500 as the liquid discharge apparatus according to an embodiment of the present disclosure is described below with reference to FIGS. 18 and 19. FIG. 18 is a plan view of a part of the printer 500. FIG. 19 is a side view of the part of the printer 500.

The printer 500 is a serial type apparatus, and a main-scanning moving mechanism 493 reciprocally moves a carriage 403 in a main scanning direction in FIG. 18. The main-scanning moving mechanism 493 includes, for example, a guide 401, a main-scanning motor 405, and a timing belt 408. The guide 401 is bridged between left and right side plates 491A and 491B to movably hold the carriage 403. The main-scanning motor 405 reciprocates the carriage 403 in the main scanning direction via the timing belt 408 looped around a drive pulley 406 and a driven pulley 407.

The carriage 403 carries a liquid discharge unit 440 in which the liquid discharge head 100 according to the present embodiment and a head tank 441 are integrated as a single unit. The liquid discharge head 100 of the liquid discharge unit 440 discharges color liquid of, for example, yellow (Y), cyan (C), magenta (M), or black (K). The liquid discharge head 100 includes a nozzle row in which the multiple nozzles 4 are arrayed in the sub-scanning direction orthogonal to the main scanning direction. The liquid discharge head 100 is mounted on the carriage 403 so that liquid is discharged downward from the nozzles 4. The liquid discharge head 100 is coupled to the liquid circulation device 600 described above so that liquid of a desired color is circulated and supplied.

The printer 500 includes a conveyance mechanism 495 to convey a sheet 410 (i.e., a medium). The conveyance mechanism 495 includes a conveyance belt 412 (i.e., a conveyor) and a sub-scanning motor 416 to drive the conveyance belt 412.

The conveyance belt 412 attracts the sheet 410 and conveys the sheet 410 at a position facing the liquid discharge head 100. The conveyance belt 412 is an endless belt looped around a conveyance roller 413 and a tension roller 414. The sheet 410 can be attracted to the conveyance belt 412 by, for example, electrostatic attraction or air suction. The conveyance belt 412 circumferentially moves in the sub-scanning direction as the conveyance roller 413 is rotationally driven by the sub-scanning motor 416 via a timing belt 417 and a timing pulley 418.

On one end of the range of movement of the carriage 403 in the main scanning direction, a maintenance mechanism 420 that maintains and recovers the liquid discharge head 100 is disposed lateral to the conveyance belt 412. The maintenance mechanism 420 includes, for example, a cap 421 to cap the nozzle face (i.e., a face on which nozzles 4 are formed) of the liquid discharge head 100 and a wiper 422 to wipe the nozzle face. The main-scanning moving mechanism 493, the maintenance mechanism 420, and the conveyance mechanism 495 are mounted onto a housing including the side plates 491A and 491B and a back plate 491C.

In the printer 500 having the above-described configuration, the sheet 410 is fed and attracted onto the conveyance belt 412 and conveyed in the sub-scanning direction by the circumferential movement of the conveyance belt 412. The liquid discharge head 100 is driven in response to image signals while the carriage 403 moves in the main scanning direction to discharge liquid to the sheet 410 not in motion, thus forming an image on the sheet 410.

Figure 20:
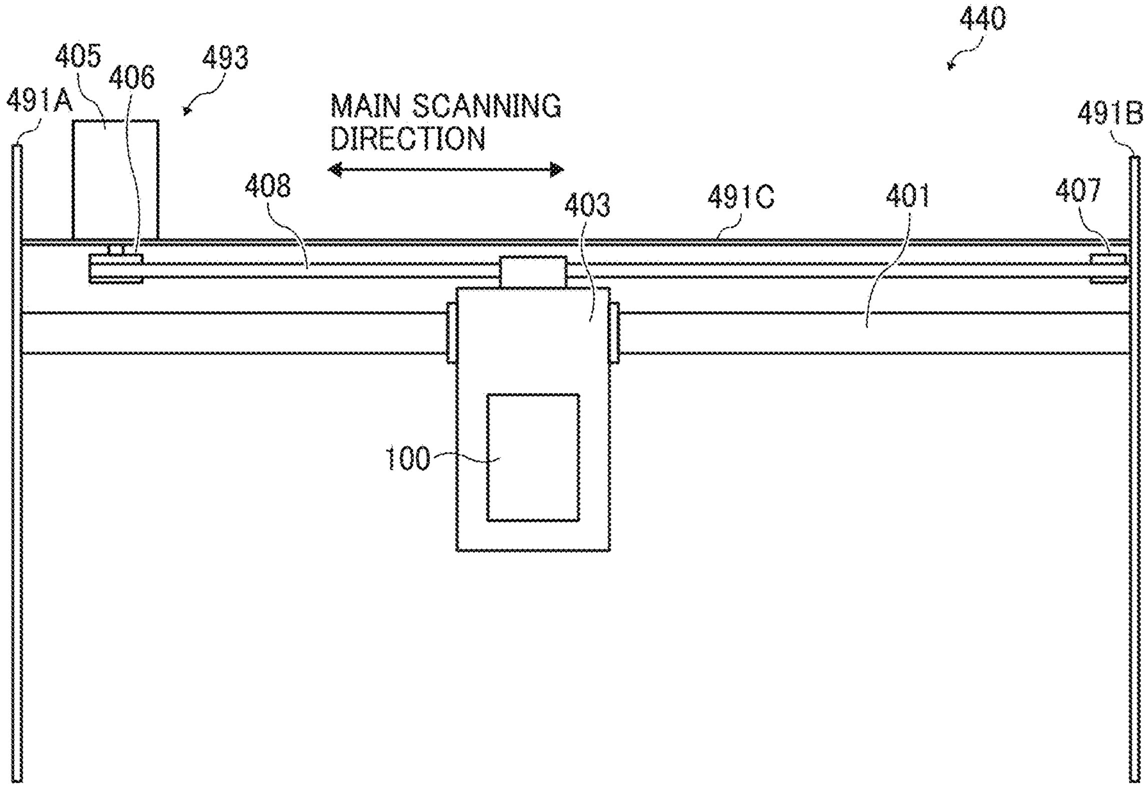
FIG. 20 is a schematic plan view of a part of a liquid discharge unit according to an embodiment of the present disclosure.

Another example of the liquid discharge unit 440 according to an embodiment of the present disclosure is described below with reference to FIG. 20. FIG. 20 is a plan view of a part of the liquid discharge unit 440 according to the present embodiment.

The liquid discharge unit 440 includes a housing, the main-scanning moving mechanism 493, the carriage 403, and the liquid discharge head 100 among components of the liquid discharge apparatus described above. The side plates 491A and 491B, and the back plate 491C construct the housing. In the liquid discharge unit 440, the maintenance mechanism 420 described above may be mounted on, for example, the side plate 491B.

Figure 21:
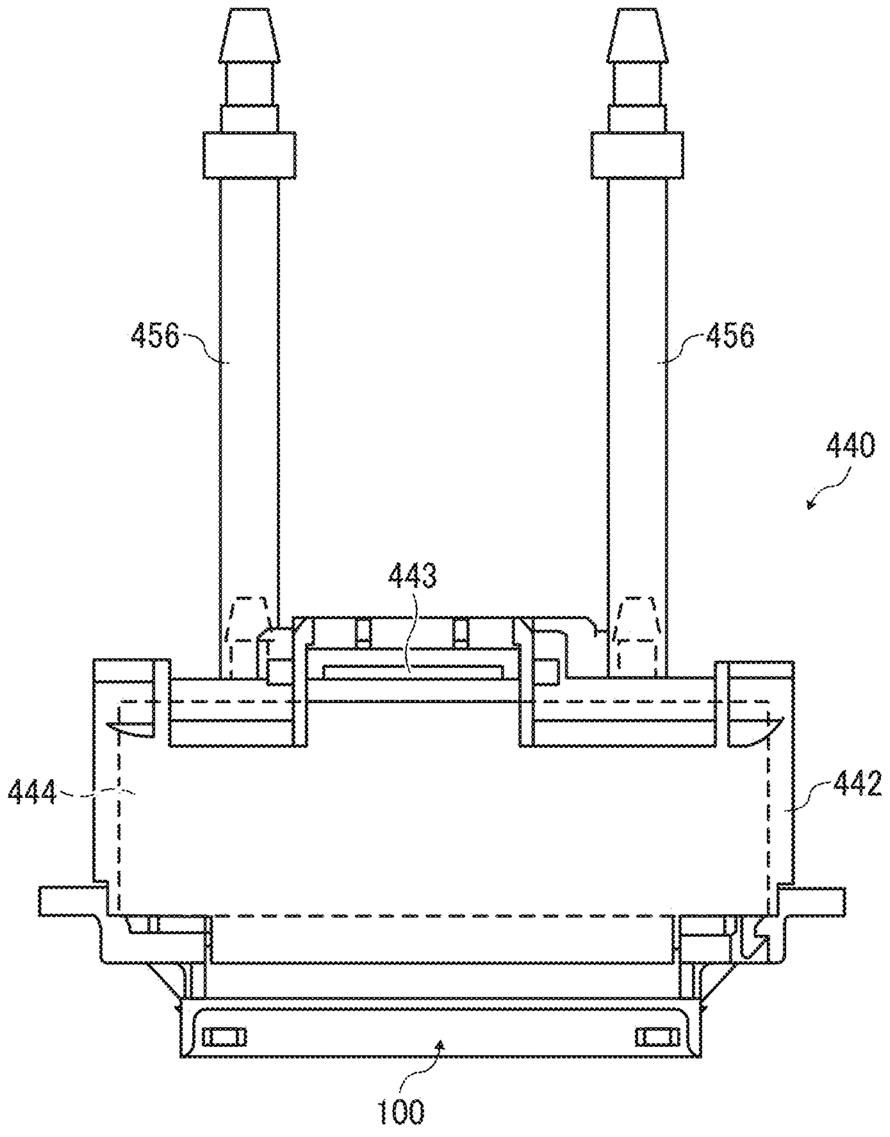
FIG. 21 is a schematic front view of another liquid discharge unit according to an embodiment of the present disclosure.

Still another example of the liquid discharge unit 440 according to an embodiment of the present disclosure is described below with reference to FIG. 21. FIG. 21 is a front view of the liquid discharge unit 440.

The liquid discharge unit 440 includes the liquid discharge head 100 to which a channel component 444 is attached, and a tube 456 connected to the channel component 444. The channel component 444 is disposed inside a cover 442. Alternatively, the liquid discharge unit 440 may include the head tank 441 instead of the channel component 444. A connector 443 for electrically connecting to the head 100 is disposed on an upper portion of the channel component 444.

In the present disclosure, the liquid to be discharged is not limited to a particular liquid as long as the liquid has a viscosity or surface tension to be discharged from a head (liquid discharge head). However, preferably, the viscosity of the liquid is not greater than 30 millipascal-second (mPa s) under ordinary temperature and ordinary pressure or by heating or cooling. Examples of the material to be discharged include a solution, a suspension, or an emulsion including, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

Examples of an energy source for generating energy to discharge liquid include a piezoelectric actuator (a laminated piezoelectric element or a thin-film piezoelectric element), a thermal actuator that employs a thermoelectric transducer element, such as a thermal resistor, and an electrostatic actuator including a diaphragm and opposed electrodes.

The "liquid discharge unit" is an assembly of parts relating to liquid discharge. The term "liquid discharge unit" represents a structure including the liquid discharge head and a functional part(s) or unit(s) combined with the liquid discharge head as a single unit. For example, the "liquid discharge unit" includes a combination (integration) of the liquid discharge head with at least one of a head tank, a carriage, a supply mechanism, a maintenance mechanism, a main-scanning moving mechanism, or a liquid circulation device.

The above integration may be achieved by, for example, a combination in which the liquid discharge head and a functional part(s) are secured to each other through, e.g., fastening, bonding, or engaging, and a combination in which one of the liquid discharge head and the functional part(s) is movably held to the other. The liquid discharge head and the functional part(s) or unit(s) may be detachably attached to each other.

For example, the liquid discharge head and the head tank are integrated to form the liquid discharge unit as a single unit. Alternatively, the liquid discharge head and the head tank coupled (connected) to each other via, for example, a tube may form the liquid discharge unit as a single unit. A unit including a filter may further be added to a portion between the head tank and the liquid discharge head of the liquid discharge unit.

In another example, the liquid discharge unit may be an integrated unit in which a liquid discharge head is integrated with a carriage.

As yet another example, the liquid discharge unit is a unit in which the liquid discharge head and the main-scanning moving mechanism are combined into a single unit. The liquid discharge head is movably held by a guide that is a part of the main-scanning moving mechanism. The liquid discharge unit may include the liquid discharge head, the carriage, and the main-scanning moving mechanism that are integrated as a single unit.

In another example, the cap that forms a part of the maintenance mechanism is secured to the carriage mounting the liquid discharge head so that the liquid discharge head, the carriage, and the maintenance mechanism are integrated as a single unit to form the liquid discharge unit.

Further, in still another example, the liquid discharge unit includes tubes connected to the liquid discharge head mounting the head tank or the channel component so that the liquid discharge head and the supply mechanism are integrated as a single unit. Through the tubes, the liquid in a liquid storage source is supplied to the liquid discharge head.

The main-scanning moving mechanism may be a guide only. The supply mechanism may be a tube(s) only or a loading device only.

The term "liquid discharge apparatus" used herein also represents an apparatus including the liquid discharge head or the liquid discharge unit to drive the liquid discharge head to discharge liquid. The liquid discharge apparatus may be, for example, any apparatus that can discharge liquid to a medium onto which liquid can adhere or any apparatus to discharge liquid toward gas or into a different liquid.

The "liquid discharge apparatus" may further include devices relating to feeding, conveying, and ejecting of the medium onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers, so as to form a three-dimensional object.

The "liquid discharge apparatus" is not limited to an apparatus that discharges liquid to visualize meaningful images such as letters or figures. For example, the liquid discharge apparatus may be an apparatus that forms patterns having no meaning or an apparatus that fabricates three-dimensional images.

The above-described term "medium onto which liquid can adhere" represents a medium on which liquid is at least temporarily adhered, a medium on which liquid is adhered and fixed, or a medium into which liquid adheres and permeates. Specific examples of the "medium onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "medium onto which liquid can adhere" includes any medium to which liquid adheres, unless otherwise specified.

Examples of materials of the "medium onto which liquid can adhere" include any materials to which liquid can adhere even temporarily, such as paper, thread, fiber, fabric, leather, metal, plastic, glass, wood, and ceramic.

The liquid discharge apparatus may be an apparatus to move the liquid discharge head and the medium onto which liquid can adhere relative to each other. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

The terms "image formation," "recording," "printing," "image printing," and "fabricating" used in the present disclosure may be used synonymously with each other.

The embodiments described above are just examples, and the various aspects of the present disclosure attain respective effects as follows.

Aspect 1

A liquid discharge head 100 includes multiple pressure chambers 6 respectively communicating with multiple nozzles 4 to discharge a liquid, a common supply channel 10 communicating with the multiple pressure chambers, and a common collection channel 50 communicating with the multiple pressure chambers. The liquid flows from the common supply channel to the common collection channel through the pressure chambers. The liquid discharge head 100 further includes communication channels 61 to 65 through which the liquid passes from the common supply channel to the common collection channel without passing through the pressure chambers. The communication channels are disposed outside a pressure chamber area 60, in which the multiple pressure chambers are disposed, in a pressure-chamber array direction (e.g., a head longitudinal direction and an X direction).

In other words, a liquid discharge head includes a nozzle plate, a channel plate, and a common channel substrate. The nozzle plate has multiple nozzles from each of which a liquid is dischargeable. The multiple nozzles are arrayed in a nozzle array direction. The channel plate has multiple pressure chambers arrayed in the nozzle array direction (pressure-chamber array direction) in a pressure chamber area. The multiple pressure chambers respectively communicate with the multiple nozzles. The common channel substrate has a common supply channel communicating with each of the multiple pressure chambers, a common collection channel communicating with each of the multiple pressure chambers, and a communication channel disposed outside the pressure chamber area in the nozzle array direction. The communication channel connects the common supply channel and the common collection channel outside the pressure chamber area and bypass the multiple pressure chambers.

In addition, the liquid discharge head includes a first supply channel including the common supply channel, the multiple pressure chambers, and the common collection channel to supply the liquid from the common supply channel to the common collection channel through the multiple pressure chambers, and a second supply channel including the common supply channel, the communication channel, and the common collection channel to supply the liquid from the common supply channel to the common collection channel through the communication channel.

In the liquid discharge head, a communication channel through which liquid passes from the common supply channel to the common collection channel without passing through the pressure chamber may be provided for various purposes such as the enhancement of the bubble purge property and the enhancement of the liquid circulation property. In the liquid discharge head of the related art, the communication channel is disposed in a position overlapping the pressure chamber area, in which multiple pressure chambers are disposed, in an array direction (i.e., the pressure-chamber array direction and the X direction) of the multiple pressure chambers arrayed in a nozzle array direction of a nozzle row in which the multiple nozzles are arrayed. This position where the communication channel is disposed, which is the area on the side of the pressure chamber area in the head transverse direction (Y direction), typically does not have sufficient space. As a result, for example, the degree of freedom in the dimensions of the communication channel and the degree of freedom in the layout of the communication channel are low, and the communication channel does not sufficiently function to achieve the various purposes described above. In addition, the communication channel disposed at the above-described position is connected to a channel portion (i.e., the connection channel portion), connected to the multiple pressure chambers, of the common supply channel and the common collection channel. Accordingly, the flow of the liquid flowing through the communication channel is likely to affect the pressure chambers, and as a result, the function of the communication channel is likely to be restricted in consideration of this effect.

In the present embodiment, the communication channel is disposed outside the pressure chamber area in the pressure-chamber array direction (X direction), in which the multiple pressure chambers are disposed. The portion outside the pressure chamber area in the pressure-chamber array direction is a portion on the side of the pressure chamber area in the head longitudinal direction, and typically has sufficient space. Accordingly, for example, the degree of freedom in the dimensions of the communication channel and the degree of freedom in the layout of the communication channel are high. In addition, since the communication channel is disposed outside the pressure chamber area in the pressure-chamber array direction, the communication channel can be connected to a channel portion other than the connection channel portion connected to the multiple pressure chambers in the common supply channel and the common collection channel. Accordingly, the flow of the liquid flowing through the communication channel is unlikely to affect the pressure chambers.

As described above, according to Aspect 1, for example, the degree of freedom in the dimensions of the communication channel and the degree of freedom in the layout of the communication channel are high, and the flow of the liquid flowing through the communication channel is unlikely to affect the pressure chambers. As a result, the restriction on the formation of the communication channel is reduced, and the communication channel can sufficiently function as desired.

Aspect 2

In Aspect 1, the common supply channel 10 includes an inlet channel 10*a* disposed outside one end side in the pressure-chamber array direction and a supply channel end 10*d* disposed outside the other end side in the pressure-chamber array direction, and the common collection channel 50 includes a drain channel 50*a* disposed outside the other end side in the pressure-chamber array direction and a collection channel end 50*d* disposed outside the one end side in the pressure-chamber array direction. The communication channel includes at least one of the communication channels 61 and 65 connecting the inlet channel and the collection channel end or the communication channels 62, 63, and 64 connecting the supply channel end and the drain channel.

In other words, the common supply channel includes an inlet channel disposed outside the pressure chamber area on a first side of the pressure chamber area in the nozzle array direction and a supply channel end disposed outside the pressure chamber area on a second side of the pressure chamber area opposite the first side in the nozzle array direction. The common collection channel includes a drain channel disposed outside the pressure chamber area on the second side of the pressure chamber area in the nozzle array direction and a collection channel end disposed outside the pressure chamber area on the first side of the pressure chamber area in the nozzle array direction. The communication channel connects at least one of the inlet channel and the collection channel end or the supply channel end and the drain channel.

The collection channel end and the supply channel end are a portion where the liquid is likely to stagnate. According to Aspect 2, the communication channel connects the collection channel end or the supply channel end, in which the liquid is likely to stagnate, to the inlet channel of the common supply channel or the drain channel of the common collection channel, respectively. Since the inlet channel is a portion to which a large positive pressure for liquid circulation is applied and the drain channel is a portion to which a large negative pressure for liquid circulation is applied, a relatively strong flow of liquid can be generated in the communication channel. According to Aspect 2, a strong flow of liquid can be generated in the collection channel end or the supply channel end, which is a portion where the liquid is likely to stagnate. As a result, the stagnation of liquid can be reduced, the liquid flows in the entire head favorably, and the bubble purge property is enhanced.

Aspect 3

In Aspect 2, the common supply channel 10 includes multiple branch channels 10*b* and 10*c* that are branched from the inlet channel and joined to the supply channel end between the inlet channel 10*a* and the supply channel end 10*d*, and the multiple branch channels communicate with the multiple pressure chambers.

In other words, the common supply channel includes multiple branch channels between the inlet channel and the supply channel end in the nozzle array direction. The multiple branch channels are branched from the inlet channel and joined to the supply channel end. The multiple branch channels respectively communicate with the multiple pressure chambers.

According to Aspect 3, the communication channels 61 to 65 are connected to the common supply channel 10 at a channel portion other than the connection channel portion of the branch channels 10*b* and 10*c* of the common supply channel 10. Accordingly, since the flow of the liquid flowing through the communication channels 61 to 65 is unlikely to affect the pressure chambers, the setting of the channel resistance of the communication channels 61 to 65 is not hindered by the effect of this flow. As a result, the restriction on the formation of the communication channel is further reduced, and the communication channel can sufficiently function as desired.

Further, the common collection channel may include multiple branch channels between the drain channel and the collection channel end in the nozzle array direction. The multiple branch channels are branched from the collection channel end and joined to the drain channel, and the multiple branch channels respectively communicate with the multiple pressure chambers.

Aspect 4

In any one of Aspects 1 to 3, a part of the common collection channel 50 is disposed above the common supply channel 10.

According to Aspect 4, the bubble purge property can be enhanced with a simple configuration.

Aspect 5

In Aspect 4, the other portion of the common collection channel 50 includes a channel portion disposed at the same height as the common supply channel 10 on a side close to the nozzles or a side far from the nozzles.

In other words, another part of the common collection channel includes a channel portion disposed at the same height as the common supply channel and closer to the multiple nozzles than the common supply channel, or another part of the common collection channel includes a channel portion disposed at the same height as the common supply channel and farther from the multiple nozzles than the common supply channel.

According to Aspect 5, since the channel portion is disposed at the same height between the common collection channel 50 and the common supply channel 10, the communication channel connecting these channels can be a horizontal channel or an ascending channel from the inlet to the outlet. Such a communication channel enhances the bubble purge property in the common supply channel 10.

Aspect 6

In any one of Aspects 1 to 3, a part of the common supply channel is disposed above the common collection channel.

According to Aspect 6, the liquid circulation property can be enhanced with a simple configuration.

Aspect 7

In Aspect 6, the other portion of the common supply channel includes a channel portion disposed at the same height as the common collection channel on a side close to the nozzles or a side far from the nozzles.

In other words, another part of the common supply channel includes a channel portion disposed at the same height as the common collection channel and closer to the multiple nozzles than the common collection channel, or another part of the common supply channel includes a channel portion disposed at the same height as the common collection channel and farther from the multiple nozzles than the common collection channel.

According to Aspect 7, since the channel portion is disposed at the same height between the common collection channel 50 and the common supply channel 10, the communication channel connecting these channels can be a horizontal channel or an ascending channel from the inlet to the outlet. Such a communication channel enhances the bubble purge property in the common supply channel 10.

Aspect 8

The liquid discharge head according to Aspect 3, further includes multiple communication channels including the communication channel. The common supply channel includes first multiple branch channels between the inlet channel and the supply channel end in the nozzle array direction. The inlet channel on the first side has a first protruding portion protruding from a first joint between the inlet channel and the first multiple branch channels in the nozzle array direction. The supply channel end on the second side has a second protruding portion protruding from a second joint between the supply channel end and the first multiple branch channels in the nozzle array direction. The common collection channel includes second multiple branch channels between the drain channel and the collection channel end in the nozzle array direction. The drain channel on the second side has a third protruding portion protruding from a third joint between the drain channel and the second multiple branch channels in the nozzle array direction. The collection channel end on the first side has a fourth protruding portion protruding from a fourth joint between the collection channel end and the second multiple branch channels in the nozzle array direction. The multiple communication channel includes a first communication channel extending in a transverse direction orthogonal to the nozzle array direction and a second communication channel extending in the transverse direction. The first communication channel connects the first protruding portion and the fourth protruding portion, and the second communication channel connects the second protruding portion and the third protruding portion.

Aspect 9

A liquid discharge unit includes the liquid discharge head according to any one of Aspects 1 to 8.

In other words, a liquid discharge unit includes multiple liquid discharge heads including the liquid discharge head according to any one of Aspects 1 to 7.

Due to such a configuration, a liquid discharge unit including the communication channel that can sufficiently function as desired can be provided.

Aspect 10

A liquid discharge apparatus includes the liquid discharge head according to any one of Aspects 1 to 8 or the liquid discharge unit according to Aspect 9.

In other words, a liquid discharge apparatus includes the liquid discharge head according to any one of Aspects 1 to 7, to discharge the liquid onto a medium and a conveyor to convey the medium to a position facing the liquid discharge head.

Due to such a configuration, a liquid discharge apparatus including the communication channel that can sufficiently function as desired can be provided.

As described above, according to one aspect of the present disclosure, the communication channel, through which a liquid passes from the common supply channel to the common collection channel without passing through the pressure chambers, sufficiently functions as desired.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a nozzle plate having multiple nozzles from each of which a liquid is dischargeable, the multiple nozzles arrayed in a nozzle array direction;

a channel plate having:

multiple pressure chambers arrayed in the nozzle array direction in a pressure chamber area, the multiple pressure chambers respectively communicating with the multiple nozzles; and a common channel substrate having:

a common supply channel communicating with each of the multiple pressure chambers;

a common collection channel communicating with each of the multiple pressure chambers; and a communication channel:

disposed outside the pressure chamber area in the nozzle array direction;

connecting the common supply channel and the common collection channel outside the pressure chamber area; and bypassing the multiple pressure chambers, wherein the common supply channel includes:

an inlet channel disposed outside the pressure chamber area on a first side of the pressure chamber area in the nozzle array direction; and a supply channel end disposed outside the pressure chamber area on a second side of the pressure chamber area opposite the first side in the nozzle array direction.

2. The liquid discharge head according to claim 1, comprising:

a first supply channel including the common supply channel, the multiple pressure chambers, and the common collection channel to supply the liquid from the common supply channel to the common collection channel through the multiple pressure chambers; and a second supply channel including the common supply channel, the communication channel, and the common collection channel to supply the liquid from the common supply channel to the common collection channel through the communication channel.

3. The liquid discharge head according to claim 1, wherein the common collection channel includes:

a drain channel disposed outside the pressure chamber area on the second side of the pressure chamber area in the nozzle array direction; and a collection channel end disposed outside the pressure chamber area on the first side of the pressure chamber area in the nozzle array direction.

4. The liquid discharge head according to claim 3, wherein the common supply channel includes multiple branch channels between the inlet channel and the supply channel end in the nozzle array direction, the multiple branch channels are branched from the inlet channel and joined to the supply channel end, and the multiple branch channels respectively communicate with the multiple pressure chambers.

5. The liquid discharge head according to claim 3, wherein the common collection channel includes multiple branch channels between the drain channel and the collection channel end in the nozzle array direction, the multiple branch channels are branched from the collection channel end and joined to the drain channel, and the multiple branch channels respectively communicate with the multiple pressure chambers.

6. The liquid discharge head according to claim 1, wherein a part of the common collection channel is disposed above the common supply channel.

7. The liquid discharge head according to claim 6, wherein another part of the common collection channel includes a channel portion disposed at the same height as the common supply channel and closer to the multiple nozzles than the common supply channel.

8. The liquid discharge head according to claim 6, wherein another part of the common collection channel includes a channel portion disposed at the same height as the common supply channel and farther from the multiple nozzles than the common supply channel.

9. The liquid discharge head according to claim 1, wherein a part of the common supply channel is disposed above the common collection channel.

10. The liquid discharge head according to claim 9, wherein another part of the common supply channel includes a channel portion disposed at the same height as the common collection channel and closer to the multiple nozzles than the common collection channel.

11. The liquid discharge head according to claim 9, wherein another part of the common supply channel includes a channel portion disposed at the same height as the common collection channel and farther from the multiple nozzles than the common collection channel.

12. The liquid discharge head according to claim 3, further comprising:

multiple communication channels including the communication channel, wherein the common supply channel includes first multiple branch channels between the inlet channel and the supply channel end in the nozzle array direction, the inlet channel on the first side has a first protruding portion protruding from a first joint between the inlet channel and the first multiple branch channels in the nozzle array direction, the supply channel end on the second side has a second protruding portion protruding from a second joint between the supply channel end and the first multiple branch channels in the nozzle array direction, the common collection channel includes second multiple branch channels between the drain channel and the collection channel end in the nozzle array direction, the drain channel on the second side has a third protruding portion protruding from a third joint between the drain channel and the second multiple branch channels in the nozzle array direction, the collection channel end on the first side has a fourth protruding portion protruding from a fourth joint between the collection channel end and the second multiple branch channels in the nozzle array direction, and the multiple communication channels include:

a first communication channel extending in a transverse direction orthogonal to the nozzle array direction, the first communication channel connecting the first protruding portion and the fourth protruding portion; and a second communication channel extending in the transverse direction, the second communication channel connecting the second protruding portion and the third protruding portion.

13. A liquid discharge unit comprising multiple liquid discharge heads including the liquid discharge head according to claim 1.

14. A liquid discharge apparatus comprising:

the liquid discharge head according to claim 1, to discharge the liquid onto a medium; and a conveyor to convey the medium to a position facing the liquid discharge head.

15. The liquid discharge head according to claim 3, wherein the communication channel connects at least one of:

the inlet channel and the collection channel end; or the supply channel end and the drain channel.

16. The liquid discharge head according to claim 3, wherein the communication channel includes a first communication channel connecting the inlet channel and the collection channel end, and a second communication channel connecting the supply channel end and the drain channel.

17. The liquid discharge head according to claim 1, wherein the communication channel extends in a transverse direction orthogonal to the nozzle array direction.

18. The liquid discharge head according to claim 1, comprising multiple communication channels including the communication channel, the multiple communication channels disposed outside the pressure chamber area on opposite sides of the pressure chamber area in the nozzle array direction.

19. The liquid discharge head according to claim 1, wherein the communication channel connects a channel portion of the common supply channel and a channel portion of the common collection channel, the channel portion of the common supply channel and the channel portion of the common collection channel each being other than a connection channel portion communicating with the multiple pressure chambers.

20. The liquid discharge head according to claim 3, wherein the communication channel connects an upper portion of the supply channel end and the drain channel.

* * * * *